United States Patent
Hefner, Jr. et al.

(10) Patent No.: US 9,920,168 B2
(45) Date of Patent: Mar. 20, 2018

(54) POLYMERS OF INTRINSIC MICROPOROSITY

(71) Applicant: Dow Global Technologies LLC, Midland, MI (US)

(72) Inventors: Robert E. Hefner, Jr., Rosharon, TX (US); Brian L. Cramm, Lake Jackson, TX (US); Ian A. Tomlinson, Midland, MI (US); Lauren M. Huffman, Midland, MI (US); Abhishek Roy, Edina, MN (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/543,348

(22) PCT Filed: Feb. 26, 2016

(86) PCT No.: PCT/US2016/019723
§ 371 (c)(1),
(2) Date: Jul. 13, 2017

(87) PCT Pub. No.: WO2016/148869
PCT Pub. Date: Sep. 22, 2016

(65) Prior Publication Data
US 2017/0369652 A1 Dec. 28, 2017

Related U.S. Application Data

(60) Provisional application No. 62/134,024, filed on Mar. 17, 2015.

(51) Int. Cl.
| C08G 73/10 | (2006.01) |
| C08G 73/06 | (2006.01) |
| B01D 71/64 | (2006.01) |
| B01D 67/00 | (2006.01) |
| C08J 3/24 | (2006.01) |

(52) U.S. Cl.
CPC ..... C08G 73/1082 (2013.01); B01D 67/0006 (2013.01); B01D 71/64 (2013.01); C08G 73/065 (2013.01); C08G 73/0644 (2013.01); C08G 73/1007 (2013.01); C08J 3/247 (2013.01); B01D 2323/30 (2013.01); C08G 2340/00 (2013.01); C08J 2379/08 (2013.01)

(58) Field of Classification Search
None
See application file for complete search history.

(56) References Cited

U.S. PATENT DOCUMENTS

| 5,629,084 | A | 5/1997 | Moya |
| 7,410,525 | B1 | 8/2008 | Liu et al. |
| 7,485,173 | B1 | 2/2009 | Liu et al. |
| 7,690,514 | B2 | 4/2010 | McKeown et al. |
| 7,758,751 | B1 | 7/2010 | Liu et al. |
| 7,771,857 | B2 | 8/2010 | Fritsch et al. |
| 7,806,962 | B2 | 10/2010 | Liu et al. |
| 7,943,543 | B1 | 5/2011 | Liu et al. |
| 8,048,198 | B2 | 11/2011 | Liu et al. |
| 8,056,732 | B2 | 11/2011 | McKeown et al. |
| 8,132,677 | B2 | 3/2012 | Liu et al. |
| 8,575,414 | B2 | 11/2013 | Liu et al. |
| 8,613,362 | B2 | 12/2013 | Liu et al. |
| 8,623,928 | B2 | 1/2014 | Du et al. |
| 8,686,104 | B2 | 4/2014 | Du et al. |
| 8,809,488 | B2 | 8/2014 | Du et al. |
| 8,814,982 | B2 | 8/2014 | Liu et al. |
| 8,894,859 | B2 | 11/2014 | Livingston et al. |
| 8,969,628 | B2 | 3/2015 | Priske et al. |
| 9,018,270 | B2 | 4/2015 | McKeown et al. |
| 9,126,185 | B2 | 9/2015 | Laskoski |
| 9,238,202 | B2 | 1/2016 | Liskey et al. |
| 2004/0198587 | A1 | 10/2004 | McKeown et al. |
| 2006/0246273 | A1 | 11/2006 | McKeown et al. |
| 2007/0209505 | A1 | 9/2007 | Liu et al. |
| 2009/0031897 | A1 | 2/2009 | Liu et al. |
| 2009/0120875 | A1 | 5/2009 | Liu et al. |
| 2009/0155464 | A1 | 6/2009 | Liu et al. |
| 2010/0130634 | A1 | 5/2010 | Fritsch |

(Continued)

FOREIGN PATENT DOCUMENTS

| KR | 20150027605 | 3/2015 |
| WO | 2005113121 | 12/2005 |

(Continued)

OTHER PUBLICATIONS

Grogojo et al., Adv. Funct. Mater. 2014, 24, 4729-4737.
Fritsch et al., Journal of Membrane Science 401-402 (2012) 222-231.
Xiaohua Ma et al., Synthesis and Gas Transport Properties of Hydroxyl-Functionalized Polyimides with Intrinsic Microporosity, Macromolecules, vol. 45, No. 9 (May 8, 2012).

(Continued)

Primary Examiner — Rachel Kahn
(74) Attorney, Agent, or Firm — Edward W. Black

(57) ABSTRACT

A polymer of intrinsic microporosity having a repeating subunit including a spirobisindane imide moiety as illustrated below.

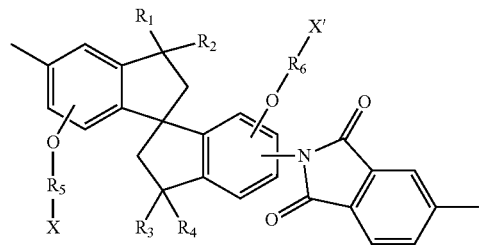

11 Claims, No Drawings

(56) References Cited

U.S. PATENT DOCUMENTS

| | | |
|---|---|---|
| 2012/0157743 A1 | 6/2012 | Liu et al. |
| 2012/0273421 A1 | 11/2012 | Perry et al. |
| 2013/0085191 A1 | 4/2013 | Laskoski |
| 2013/0112619 A1 | 5/2013 | Livingston et al. |
| 2013/0146538 A1 | 6/2013 | Liu et al. |
| 2013/0172433 A1 | 7/2013 | McKeown et al. |
| 2013/0217799 A1 | 8/2013 | Visser et al. |
| 2013/0247756 A1 | 9/2013 | Li et al. |
| 2013/0267616 A1 | 10/2013 | McKeown et al. |
| 2014/0251897 A1 | 9/2014 | Livingston et al. |
| 2014/0255636 A1 | 9/2014 | Odeh et al. |
| 2015/0148439 A1 | 5/2015 | Eddaoudi et al. |
| 2015/0165383 A1 | 6/2015 | Liskey et al. |
| 2015/0239806 A1 | 8/2015 | Wendland |

FOREIGN PATENT DOCUMENTS

| | | | |
|---|---|---|---|
| WO | 2012035328 | 3/2012 | |
| WO | WO-2013172554 A1 * | 11/2013 | ............ B01D 71/64 |
| WO | 2014186108 | 11/2014 | |
| WO | 2015018576 | 2/2015 | |
| WO | 2015095026 | 6/2015 | |
| WO | 2015095034 | 6/2015 | |
| WO | 2015095044 | 6/2015 | |
| WO | 2015129925 | 9/2015 | |
| WO | 2016161367 | 10/2016 | |
| WO | 2016195977 | 12/2016 | |
| WO | 2016206008 | 12/2016 | |
| WO | 2017030450 | 2/2017 | |
| WO | 2017091357 | 6/2017 | |

OTHER PUBLICATIONS

Xiaohula Ma et al., Novel Spirobifluorene and Dibromospirobifluorene-based Polyimides of Intrinsic Microporosity for Gas Separation Applications, Macromolecules, vol. 46, No. 24, (Dec. 23, 2013).

Fu Yun Li et al., High-Performance Thermally Self-Cross-Linked Polymer of Intrinsic Microporosity (PIM-1) Membranes for Energy Development, Macromolecules, vol. 45, No. 3, (Feb. 14, 2012).

McKeown, et al., Polymers of Intrinsic Microporosity, Enc. Polymer Sci. & Tech., John Wiley & Sons Ltd., (2009).

Pinnau, I. et al., Hydrocarbon/hydrogen mixed gas permeation in PTMSP, poly(1-phenyl-1-propyne) (PPP), and PTMSP/PPP blends, J. Polymer Sci. Part B: Polymer Physics, 34, 15 (1996) 2612-2621.

Pinnau, I and Toy, L.G. (1996) Transport of organic vapors through PTMSP, J. Mem. Sci., 116, 199.

Budd, P.M. et al. (2004) PIMs: robust, solution-processable, organic nanoporous materials, Chem. Commun., (2), 230-231.

Mckeown, Budd, et al., Polymers of Intrinsic Microporosity (PIMS): Bridging the Void between Microporous and Polymeric Materials, Chem. Eur. J. (2005), 2610-2620.

Budd, McKeown & Fritsch, Free Volume and Intrinsic Microporosity in Polymers, J. Mater. Chem. (2005) 15, 1977-1986.

Budd, McKeown, Fritsch, et al., Gas Separation Membranes from Polymers of Intrinsic Microporosity, J. Mem. Sci. 251, (2005) 263-269.

Budd, McKeown & Fritsch, Polymers of Intrinsic Microporosity (PIMS): High Free Volume Polymer for Membrane Applications, Macromol. Symp., 245-246 (2006) 403-405.

Xinhuai Ye, et al., Synthesis and Characterization of New Sulfonated Polyimides as Proton-Exchange Membranes for Fuel Cells, J. Mem. Sci, 279, issues 1-2 (2006) 570-577.

Thomas, S. et al., Pure and mixed-gas permeation properties of a microporous spirobisindane-based ladder polymer (PIM-1), J. Mem. Sci. 333 (2009) 125-131.

Naiying Du, et al., Azide-based Cross-Linking of Polymers of Intrinsic Microporosity (PIMs) for Condensable Gas Separation, Macromolecular Rapid Communication, (2011), 32, 631-636.

Ma, et al., Macromolecules 45 (2012) 3841.

Choi, et al., Bulletin of the Korean Chemical Society 34, 12 (2013) 3888.

* cited by examiner

POLYMERS OF INTRINSIC MICROPOROSITY

FIELD

The invention relates to polymers that possess intrinsic microporosity and which have particular utility as membranes.

INTRODUCTION

Polymers with intrinsic microporosity (PIMS) are characterized by having macromolecular structures that are both rigid and contorted so as to have extremely large fractional free volumes. Examples include poly(1-trimethylsilyl-1-propyne) (PTMSP), poly(4-methyl-2-pentyne) (PMP) and polybenzodioxane (PIM-1). Because of their exceptional free volume, all are extremely permeable. For illustrative purposes, the free volume and B.E.T. (Brunauer-Emmett-Teller method) surface area of PTMSP and PIM-1 are compared with a conventional glassy polymer, polysulfone. See: Baker, Membrane Technology and Applications, 3$^{rd}$ ed., (2012), and Polymers of Intrinsic Microporosity, Enc. Polymer Sci. & Tech., (2009)—both by John Wiley & Sons Ltd.

| Polymer | Free Volume (%) | BET surface area (m$^2$/g) |
| --- | --- | --- |
| PTMSP | 29 | 550 |
| PIM-1 | 25 | 830 |
| Polysulfone | 18 | <1 |

See also: Pinnau, I. et al., Hydrocarbon/hydrogen mixed gas permeation in PTMSP, poly(l-phenyl-1-propyne) (PPP), and PTMSP/PPP blends. J. Polymer Sci. Part B: Polymer Physics, 34, 15 (1996) 2612-2621; Pinnau, I and Toy, L. G. (1996) Transport of organic vapors through PTMSP, J. Mem. Sci., 116, 199; Budd, P. M. et al. (2004) PIMs: robust, solution-processable, organic nanoporous materials, Chem. Commun., (2), 230-231; Mckeown, Budd, et al., Polymers of Intrinsic Microporosity (PIMS): Bridging the Void between Microporous and Polymeric Materials, Chem. Eur. J. (2005), 2610-2620; Budd, McKeown & Fritsch, Free Volume and Intrinsic Microporosity in Polymers, J. Mater. Chem. (2005) 15, 1977-1986; Budd, McKeown, Fritsch, et al., Gas Separation Membranes from Polymers of Intrinsic Microporosity, J. Mem. Sci. 251, (2005) 263-269; Budd, McKeown & Fritsch, Polymers of Intrinsic Microporosity (PIMS): High Free Volume Polymer for Membrane Applications, Macromol. Symp., 245-246 (2006) 403-405; Xinhuai Ye, et al., Synthesis and Characterization of New Sulfonated Polyimides as Proton-Exchange Membranes for Fuel Cells, J. Mem. Sci, 279, issues 1-2 (2006) 570-577; Thomas, S. et al., Pure and mixed-gas permeation properties of a microporous spirobisindane-based ladder polymer (PIM-1), J. Mem. Sci. 333 (2009) 125-131; Naiying Du, et al., Azide-based Cross-Linking of Polymers of Intrinsic Microporosity (PIMs) for Condensable Gas Separation, Macromolecular Rapid Communication, (2011), 32, 631-636; Ma, et al., Macromolecules 45 (2012) 3841; and Choi, et al., Bulletin of the Korean Chemical Society 34, 12 (2013) 3888.

See also: WO2005/113121; US2004/01985587; US2013/0146538; US2013/0172433; US2013/0267616; U.S. Pat. No. 8,623,928; U.S. Pat. No. 8,575,414; U.S. Pat. No. 8,056,732; U.S. Pat. No. 7,943,543; U.S. Pat. No. 7,690,514 and U.S. Pat. No. 7,410,525 which are incorporated herein in their entirety. In particular, WO 2005/113121 describes a thin layer composite membrane including a thin selective layer of a microporous polybenzodioxane.

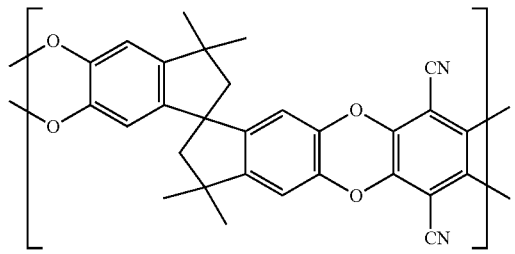

Polybenzodioxane (PIM-1)

SUMMARY

In one embodiment, the invention includes oligomers, copolymers and polymers (hereinafter collectively "polymers") of intrinsic microporosity including a repeating unit as represented by Formula Ia.

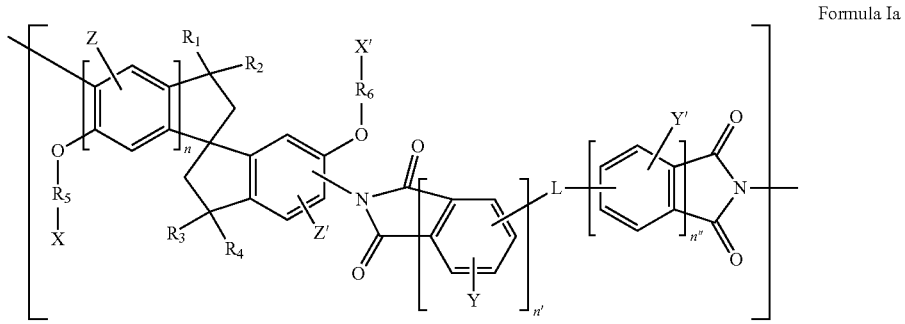

Formula Ia wherein:
  n, n' and n" are integers independently selected from 1 or 2;
  L is a linking group selected from a covalent bond, ketone, sulfone group or hydrocarbon comprising from 1 to 6 carbon atoms;
  $R_1$, $R_2$, $R_3$, and $R_4$ are independently selected from alkyl groups comprising from 1 to 6 carbon atoms, and $R_1$ and $R_2$ may additionally collectively form a ketone group or a 9,9'-fluorene group, and $R_3$ and $R_4$ may collectively form a ketone group or a 9,9'-fluorene group;

$R_5$ and $R_6$ are independently selected from: a bond and an alkylene group comprising from 1 to 6 carbon atoms;

X and X' are independently selected from: a carboxylic acid and sulfonic acid and their corresponding salt or ester, imino (iminocarbamate, iminocarbonate), amide, nitrile, hydrogen, hydroxyl and alkenyl comprising from 1 to 6 carbon atoms, with the proviso that only one X and X' is selected from hydrogen or hydroxyl; and Y and Y' is independently selected from hydrogen, hydroxyl or sulfonate group including its corresponding salt or ester, which may be located at any open position on the ring; and Z and Z' are independently selected from: carboxylic acid or sulfonate including their corresponding salts or esters; hydrogen, hydroxyl, nitrile, and alkoxy comprising from 1 to 6 carbon atoms, which may be located at any open position on the ring.

In the event that either X and X' are an imino (—C(A)=NR$_7$) group, A is independently selected from a secondary and tertiary amine, hydroxyl or alkoxy and $R_7$ is selected from hydrogen or an alkyl group comprising from 1 to 6 carbon atoms.

In a preferred subclass of embodiments, at least one and preferably all of the following definitions apply: i) n, n' and n" are each 1; ii) Z, Z', Y and Y' are hydrogen or hydroxyl; and iii) L is a covalent bond. A representative repeating unit is illustrated in Formula Ib.

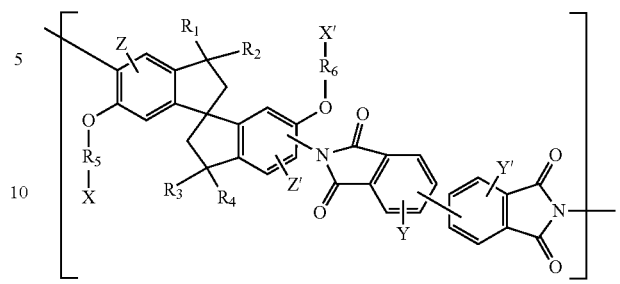

Formula Ib

In another preferred subgroup of embodiments and in reference to Formula Ia and Ib, at least one and preferably all the following more restrictive definitions apply: i) $R_1$, $R_2$, $R_3$, and $R_4$ are independently selected from: methyl, or $R_1$ and $R_2$ and $R_3$ and $R_4$ collectively form a ketone group; $R_5$ and $R_6$ are independently selected from a covalent bond and a methylene group; and iii) at least one of X and X' is selected from: a carboxylic acid and sulfonic acid and their corresponding salt or ester, nitrile, iminocarbamate and iminocarbonate. In another embodiment, the invention includes a method for crosslinking the polymers of Formulae Ia and Ib along with the resulting crosslinked polymers. A representative crosslinked polymer is generally represented in Formula II (wherein n, n' and n" are 1).

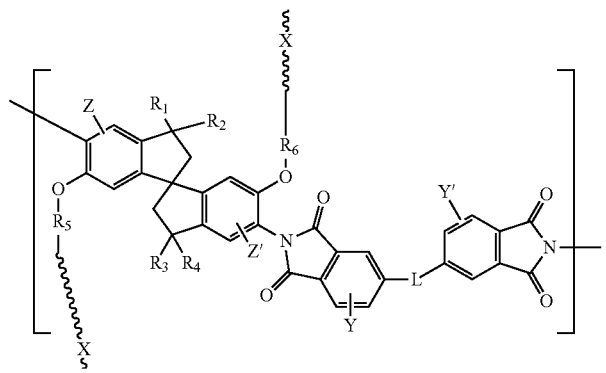

Formula II

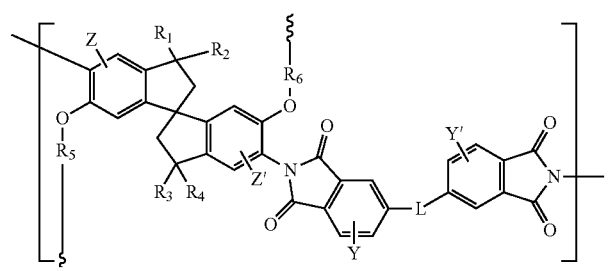

-continued

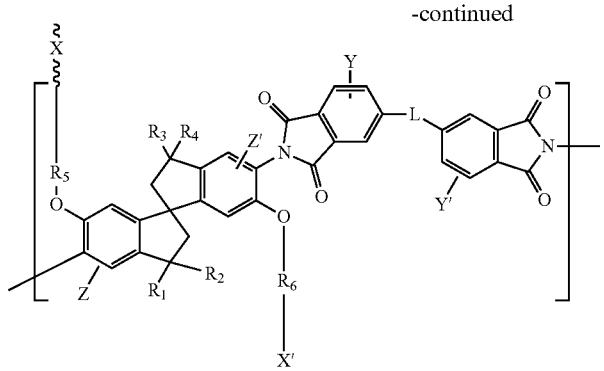

In yet another embodiment, the invention includes a membrane made using the subject polymers. Such membranes may be formed by conventional techniques, e.g. casting, in situ polymerization upon a porous support, dip coating and subsequent polymerization onto a porous support, etc. Such membranes are useful in separations based upon the relative rates of mass transfer of different species across a membrane. A driving force, typically a pressure or a concentration difference, is applied across the membrane so that selected species preferentially pass across the membrane. The inventive membranes may be used for purification, separation or adsorption of a particular species (e.g. salts, organics, ionic species) in the liquid (e.g. aqueous, organic) or gas phase. The inventive membranes may, for example, be used for the separation of proteins or other thermally unstable compounds, e.g. in the pharmaceutical and biotechnology industries. The membranes may also be used in fermenters and bioreactors to transport gases into the reaction vessel and transfer cell culture medium out of the vessel. Additionally, the membranes may be used for the removal of microorganisms from air or water streams (NF), water purification, ethanol production in a continuous fermentation/membrane pervaporation system, and detection or removal of trace compounds or metal salts in air or water.

DETAILED DESCRIPTION

The invention includes oligomers, polymers and copolymers (collectively referred to herein as "polymers") of intrinsic microporosity ("PIMs"). The subject polymers include a repeating subunit including a spirobisindane imide moiety and are more generally represented by Formula III where the one or more of the illustrated aromatic rings may also include two fused aromatic rings, and each aromatic ring may be substituted or unsubstituted. The spirobisindane imide moiety creates a point of contortion in polymers.

Formula III

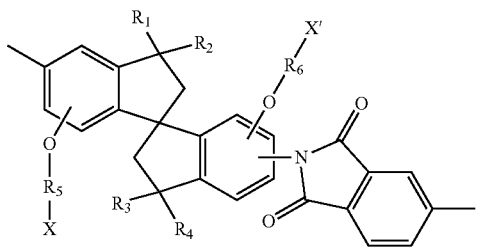

The precursor spirobisindane imide oligomers, polymers and copolymers may be prepared using the methods described by Ma, X; Swaidan, Y. B.; Zhu, Y.; Litwiller, E.; Jouiad, I. P.; Han, Y.; Macromolecules, 45, 3841-3849 (2012); Li, S.; Jo, H. J.; Han, S. H.; Park, C. H.; Kim, S; Budd, P. M.; Lee, Y. M.; Journal of Membrane Science, 434, 137-147 (2013). Direct dinitration of 3,3,3',3'-tetramethyl-1,1'-spirobisindane-6,6'-diol provides a mixture of regioisomers, specifically 3,3,3',3'-tetramethyl-1,1'-spirobisindane-5,5'-dinitro-6,6'-diol and 3,3,3',3'-tetramethyl-1,1'-spirobisindane-5,7'-dinitro-6,6'-diol as described by Molteni, V.; Rhodes, D.; Rubins, K.; Hansen, M.; Bushman, F. D.; Siegel, J. S.; J. Med. Chem., 43, 2031-2039 (2000) through nitration of 3,3,3',3'-tetramethyl-1,1'-spirobisindane-6,6'-diol followed by chromatographic separation of the isomeric nitro compounds. Detailed analytical characterization via $^1$H NMR, $^{13}$C NMR and accurate mass measurement MS analysis are also described. Choi, J. S.; Ahn, S-H.; Lee, K. H.; Lee, Y. M.; Lee, K-H.; Bull. Korean Chem. Soc., 34, 12, 3888-3890 (2013) describes an applicable synthetic methodology for preparation of 3,3,3',3'-tetramethyl-1,1'-spirobisindane-5,5'-dinitro-6,6'-diol regioisomer and corresponding diamine. The synthetic method requires additional steps of (a) O-benzylation of 3,3,3',3'-tetramethyl-1,1'-spirobisindane-6,6'-diol to give 6,6'-dibenzyloxy-3,3,3',3'-tetramethyl-1,1-spirobisindane, and (b) debenzylation of the 6,6'-dibenzyloxy-3,3,3',3'-tetramethyl-5,5'-dinitro-1,1-spirobisindane formed by dinitration to give the 3,3,3',3'-tetramethyl-1,1'-spirobisindane-5,5'-dinitro-6,6'-diol regioisomer which is then hydrogenated to the corresponding diamine Prior to the synthetic methodology of Choi and co-workers, Kenhale, A. M.; Gonnade, R.; Rajamohanan, P. R.; Hofman, H-J.; Sanjayan, G. J.; Chem. Commun., 2541-2543 (2008) described the selective nitration of 6,6'-dimethoxy-3,3,3',3'-tetramethyl-1,1-spirobisindane to give 6,6'-dimethoxy-3,3,3',3'-tetramethyl-5,5'-dinitro-1,1-spirobisindane.

The subject polymers may include additional repeating units or branching, i.e. be formed via a copolymerization; however, the subject polymers preferably comprise at least 50 molar %, 75 molar % and more preferably at least 90 molar % of repeating units represented by Formula Ia (e.g. 50-100 molar %, 75-100 molar % and 90 to 100 molar % of the subject monomers).

The process employed to convert a part or all of the phenolic hydroxyl groups of the spirobisindane imide polymers to cyanate groups involves reacting at least one aromatic hydroxyl group therein using 0.01 to 1.20 moles of cyanogen halide per aromatic hydroxyl group at a temperature and time sufficient to essentially complete the reaction and thereafter isolating the product. Preferred reaction conditions include a temperature of from about −40° C. to about 40° C., preferably from about −20° C. to about 20° C., for about 5 minutes to about 120 minutes, preferably from about 10 minutes to about 45 minutes. Suitable cyanogen halides which can be employed to convert a part or all of the phenolic hydroxyl groups of the spirobisindane imide polymers to cyanate groups, include, for example, cyanogen chloride, cyanogen bromide, mixtures thereof and the like. Alternately, the method of Martin and Bauer described in Organic Synthesis, volume 61, pages 35-68 (1983) published by John Wiley and Sons can be used to generate the required halide in situ from sodium cyanide and a halogen such as chlorine or bromine. Suitable base materials which can be employed to convert a part or all of the phenolic hydroxyl groups of the spirobisindane imide polymers to cyanate groups, include both inorganic bases and tertiary amines, such as, for example, sodium hydroxide, potassium hydroxide, triethylamine, pyridine, lutidine, mixtures thereof and the like. The tertiary amines are most preferred as the base material. An inert solvent is used as the reaction medium. Suitable such solvents include, for example, aliphatic and cycloaliphatic ethers and diethers, chlorinated hydrocarbons, ketones, water, mixtures thereof and the like. Most preferred solvents include diethyl ether, tetrahydrofuran, 1,4-dioxane, cyclopentanone, cyclohexanone, acetone and methylene chloride.

The spirobisindane imide polymers containing cyanate groups are self-crosslinking materials may thus be referred to as "one-component thermosets." Crosslinking forms a three dimensional network polymer wherein the crosslinking structure comprises the triazine moiety. For example, when X (or X') of three repeating units are each a nitrile group, reaction between the cyanate groups forms a triazine moiety that serves as a crosslink. The spirobisindane imide polymers containing cyanate groups are preferably crosslinked (see representative Formula III) to provide additional rigidity, pore stability and improve one or more of pH resistance, thermal resistance and solvent resistance.

The spirobisindane imide polymers containing cyanate groups are crosslinked (cured, thermoset) by heating from about 50° C. to about 400° C., preferably by heating from 100° C. to 250° C., optionally in the presence of a suitable catalyst. Suitable catalysts include, for example, acids, bases, salts, nitrogen and phosphorus compounds, such as for example, Lewis acids such as $AlCl_3$, $BF_3$, $FeCl_3$, $TiCl_4$, $ZnCl_2$, $SnCl_4$; protonic acids such as HCl, $H_3PO_4$; aromatic hydroxy compounds such as phenol, p-nitrophenol, pyrocatechol, dihydroxynaphthalene; sodium hydroxide, sodium methylate, sodium phenolate, trimethylamine, triethylamine, tributylamine, diazabicyclo [2.2.2]octane, quinoline, isoquinoline, tetrahydroisoquinoline, tetraethylammonium chloride, pyridine-N-oxide, tributyl phosphine, zinc octoate, tin octoate, zinc naphthenate, cobalt naphthenate, cobalt octoate, cobalt acetylacetonate and the like. Also suitable as catalysts are the metal chelates such as, for example, the chelates of transition metals and bidentate or tridentate ligands, particularly the chelates of iron, cobalt, zinc, copper, manganese, zirconium, titanium, vanadium, aluminum and magnesium. These and other operable catalysts are disclosed in U.S. Pat. No. 3,694,410 and U.S. Pat. No. 4,094,852 which are incorporated herein by reference in their entirety. Cobalt naphthenate, cobalt octoate and cobalt acetylacetonate are most preferred as the catalysts. The quantity of catalyst used, if any, depends on the structure of the particular catalyst, the structure of the spirobisindane imide polymer containing cyanate groups being crosslinked, the cure temperature, the cure time, and the like. Generally, catalyst concentrations of from about 0.001 to about 2 percent by weight are preferred.

In addition to the catalysts previously delineated for the polymerization (polycyclotrimerization) of cyanate groups, when compounds containing one or more polymerizable ethylenically unsaturated group(s), compounds which simultaneously contain both a cyanate or cyanamide group and a polymerizable ethylenically unsaturated group, compounds which simultaneously contain both a 1,2-epoxide group and a polymerizable ethylenically unsaturated group, or compounds which simultaneously contain both a maleimide group and a cyanate group, are used as monomers which contain at least one group which is copolymerizable with the cyanate group, it is often desirable to utilize one or more free radical forming catalysts for the purpose of polymerizing all or a part of said unsaturated groups. Free radical forming catalysts include the organic peroxides and hydroperoxides as well as the azo and diazo compounds. Preferred free radical forming catalysts include benzoylperoxide, t-butylhydroperoxide, t-butylylperoxybenzoate, azobisisobutyronitrile, dicumylperoxide, di-tert-butylperoxide and cumene hydroperoxide. The quantity of catalyst used, if any, depends on the structure of the particular catalyst, the structure of the components used in the polymerizable mixture, the crosslink structure desired, the cure time, the cure temperature, and the like. Generally, catalyst concentrations of from about 0.001 to about 2 percent by weight are preferred.

The spirobisindane imide polymers containing cyanate groups may be combined with one or more monomers which contain at least one group which is copolymerizable with the cyanate group to form a copolymerizable mixture and then reacted to crosslink. Suitable monomers containing at least one group which is copolymerizable with the cyanate group may be selected from the group consisting of di and polycyanate or di and polycyanamide monomers, epoxy resins having an average of more than one vicinal epoxide group per molecule, di and polymaleimide monomers, compounds containing one or more polymerizable ethylenically unsaturated group(s) including vinyl (—CH=$CH_2$), acrylate, allyl, methallyl, propenyl, isopropenyl or methacrylate groups; compounds which contain both a cyanate or cyanamide group and a polymerizable ethylenically unsaturated group in the same molecule; compounds which contain both a 1,2-epoxide group and a polymerizable ethylenically unsaturated group in the same molecule; and compounds which contain both a maleimide group and a cyanate group in the same molecule.

Changes in the mole ratio of cyanate groups and polymerizable ethylenically unsaturated groups and/or maleimide groups can be made to influence the composition of the cured product. Increasing the mole ratio of cyanate groups to polymerizable ethylenically unsaturated groups and/or maleimide groups can be done to increase the relative amount of triazine groups in the copolymerized product. A decrease in the mole ratio of cyanate groups to polymerizable ethylenically unsaturated groups and/or maleimide groups favors an increase in the amount of ethylenically unsaturated group copolymerization structures or maleimide group copolymerization structures in the copolymerized product.

A part or all of the cyanate groups in the spirobisindane imide polymers may be reacted with one or more monol, diol or polyol containing compounds to convert cyanate groups to iminocarbonate groups. In the typical reaction the desired amount of the hydroxyl containing compound is added to a solution of the spirobisindane imide polymer containing cyanate groups with mixing. Inert solvents useful for the reaction to form the iminocarbonate include those given herein for used in the reaction of the spirobisindane imide polymer and cyanogen halide. A catalyst, such as a protonic acid, may be used but is generally unnecessary. To convert only a part of the cyanate groups to iminocarbonate groups, less than stoichionmetric hydroxyl containing compound is used in the reaction. Reaction to convert a part or all of the cyanate groups of the spirobisindane imide polymers to iminocarbonate groups, is conducted at a temperature of from about 0° C. to about 100° C., preferably from about 25° C. to about 50° C., for from about 5 minutes to about 240 minutes, preferably from about 15 minutes to about 60 minutes. Spectrophotometric methods, such as Fourier transform infrared (FTIR) spectrophotometric analysis may be conveniently employed to monitor conversion of cyanate groups to iminocarbonate groups.

A part or all of the cyanate groups in the spirobisindane imide polymers may be reacted with one or more monoamine, diamine or polyamine containing compounds to convert cyanate groups to iminocarbamate groups. In the typical reaction the desired amount of the amine containing compound is added to a solution of the spirobisindane imide polymer containing cyanate groups with mixing. Inert solvents useful for the reaction to form the iminocarbamate include those given herein for used in the reaction of the spirobisindane imide polymer and cyanogen halide. To convert only a part of the cyanate groups to iminocarbamate groups, less than stoichionmetric amine containing compound is used in the reaction. Reaction to convert a part or all of the cyanate groups of the spirobisindane imide polymers to iminocarbamate groups, is conducted at a temperature of from about 0° C. to about 100° C., preferably from about 20° C. to about 30° C., for from about 1 minute to about 240 minutes, preferably from about 5 minutes to about 30 minutes. Spectrophotometric methods, such as FTIR spectrophotometric analysis may be employed to monitor conversion of cyanate groups to iminocarbamate groups.

Carboxylic acids may be crosslinked by a primary amine compound in the presence of a carbodiimide compound. Thus, a crosslinkable mixture may be prepared consisting of a spirobisindane imide polymer containing carboxylic acid groups with one or more primary amine containing compounds (monoamine, diamine, and/or polyamines may be used) and one or more carbodiimide crosslinking agents. For crosslinking in aqueous media, a water-soluble carbodiimide is employed, such as 1-ethyl-3-(−3-dimethylaminopropyl) carbodiimide hydrochloride. For crosslinking in non-aqueous media, an organic solvent soluble carbodiimide is employed, such as N',N'-dicyclohexyl carbodiimide. In the crosslinking chemistry, the carbodiimide reacts with carboxylic acid groups to form an active O-acylisourea intermediate that is easily displaced by nucleophilic attack from primary amino groups in the reaction mixture. Reaction with the primary amine results in an amide bond formed with the original carboxyl group, with the carbodiimide by-product is released as a urea derivative. 1-ethyl-3-(−3-dimethylaminopropyl) carbodiimide hydrochloride crosslinking is most efficient in acidic (pH 4.5) conditions and must be performed in buffers devoid of extraneous carboxyls and amines 4-morpholinoethanesulfonic acid buffer is a suitable carbodiimide reaction buffer. Phosphate buffers and neutral pH (up to 7.2) conditions are compatible with the reaction chemistry, but with lower efficiency.

The subject polymers are "microporous;" that is, they possess an interconnected system of voids having diameters less than 2 nm. Preferably, the polymers have average pore diameters of from 0.2 to 20 nm as determined by standard bubble point test (e.g. ASTM F316-03 (2011)). The polymers also have high apparent surface areas (e.g. greater than 100 $m^2/g$, and more preferably greater than 150 $m^2/g$ as determined by the Brunauer-Emmett-Teller (BET) method.

The subject polymers may be fabricated into a membrane. The membrane is not particularly limited to a specific type, construction or application. For example, the subject polymers may be fabricated into to flat sheet (film), tubular and hollow fiber configurations that find utility in a variety of applications including gas separations, pervaporation, forward osmosis (FO), reverse osmosis (RO), nano filtration (NF), ultra filtration (UF), micro filtration (MF) and pressure retarded fluid separations. One preferred design is a thin film composite structure. See for example WO 2005/113121. With a thin film composite design a "thin film" of the subject polymer is formed upon a support using well known techniques, e.g. dip coating, casting, etc., a solution of the subject polymer and conducting a phase separation (e.g. via quench, cooling, etc.) to form the desired porosity. The resulting membrane may be further subject to heating to facilitate crosslinking By way of a more specific example, the composite membrane may include a bottom layer (back side) of a nonwoven backing web (e.g. PET scrim), a middle layer of a porous support having a typical thickness of about 25-125 µm and top layer (front side) comprising a thin film polymer layer having a thickness typically less than about 1 micron, e.g. from 0.01 micron to 1 micron but more commonly from about 0.01 to 0.1 µm. The porous support is typically a polymeric material having pore sizes which are of sufficient size to permit essentially unrestricted passage of permeate but not large enough so as to interfere with the bridging over of a thin film polymer layer formed thereon. For example, the pore size of the support preferably ranges from about 0.001 to 0.5 µm. Non-limiting examples of porous supports include those made of: polysulfone, polyether sulfone, polyimide, polyamide, polyetherimide, polyacrylonitrile, poly(methyl methacrylate), polyethylene, polypropylene, and various halogenated polymers such as polyvinylidene fluoride. For most applications, the porous support provides strength but offers little resistance to fluid flow due to its relatively high porosity.

EXAMPLES

Example 1—PIM Polyimide Polycyanate Synthesis

A. Synthesis of Crude 3,3,3',3'-Tetramethyl-1,1'-spirobisindane-6,6'-diol

Crude 3,3,3',3'-tetramethyl-1,1'-spirobisindane-6,6'-diol was prepared via reaction of 4,4'-isopropylidenediphenol (Dow Chemical Co., Parabis™, bisphenol A, 99.7%) at 50° C. using methanesulfonic acid (≥99.5%) as both catalyst and solvent. Methanesulfonic acid (450 grams) was charged to a 1 L, glass, 3 neck, round bottom reactor equipped with a room temperature overhead condenser and overhead nitrogen inlet (maintained at 0.5 LPM) both attached to a Claisen adaptor, thermometer, mechanical stirring (variable speed, glass shaft, polytetrafluoroethylene paddle). The 4,4'-isopropylidenediphenol (200.0 grams) was added to the reactor with a polypropylene funnel, then stirring was initiated to give a light tan colored slurry at 22° C. Heating commenced using a heating mantle which was cycled with a pair of cooling fans on the reactor exterior. After 16 minutes, the 50° C. target reaction temperature was achieved, cycling of the heating and cooling began and the product in the reactor was a dark red colored slurry. After a cumulative 60 minutes at 50° C., an amber colored solution had formed. At this time, the mechanical stirring was removed from the reactor and switched to magnetic stirring using a stirring bar added to the reactor. The solution in the reactor was then held at 50° C. with stirring under the nitrogen atmosphere. After a cumulative 56.0 hours, HPLC analysis of a sample of the burgundy brown colored solution demonstrated full conversion of the 4,4'-isopropylidenediphenol reactant to mixture of 45.23 area % phenol, 6.56 area % of an unknown compound, and 47.63 area % 3,3,3',3'-tetramethyl-1,1'-spirobisindane-6,6'-diol. After a cumulative 56.25 hours, reaction ceased and work-up commenced. The solution from the reactor was poured into a 4 L glass beaker containing 2.5 L DI water which was magnetically stirred. A white crystalline precipitate formed. The slurry was vacuum filtered through a medium fritted glass funnel. The cake on the filter was packed to remove as much liquid as possible. The cake on the filter was removed and added to a 1 L glass beaker containing 0.4 L DI water which was magnetically stirred and heated to 75° C. The hot slurry was vacuum filtered on a medium fritted glass funnel and again packed to remove as much liquid as possible. A second DI water wash was performed using the method of the first wash. The weight of the slightly damp product recovered from the filter was 90.77 grams. The product was dried in the vacuum oven at 50° C. to a constant weight of 90.0 grams. HPLC analysis of the product demonstrated phenol (0.39 area %), unknown compound (13.08 area %) and 3,3,3',3'-tetramethyl-1,1'-spirobisindane-6,6'-diol (86.51 area %).

B. Recrystallization to High Purity 3,3,3',3'-Tetramethyl-1,1'-spirobisindane-6,6'-diol A portion (50.0 grams) of the product was added to a beaker and magnetically stirred with 40/60 wt./wt. ethanol (750 grams)/DI water (1050 grams) solution, covered with aluminum foil and heated to boiling. A total of 1750 grams of the ethanol/water solution was required to provide a solution at boiling. Boiling time of 42 minutes was required to put the last insoluble 3,3,3',3'-tetramethyl-1,1'-spirobisindane-6,6'-diol into solution. The ethanol used was denatured with 5% methanol and 5% isopropanol. The covered beaker of solution was held overnight at room temperature. Crystalline needles formed upon cooling and became a white fibrous mass. The product was recovered by vacuum filtration on a medium fitted glass funnel. The product was dried in the vacuum oven at 50° C. to a constant weight of 39.17 grams of white needlelike crystals as a fibrous mass. HPLC analysis of the product demonstrated no detectable phenol, unknown compound (1.29 area %) and 3,3,3',3'-tetramethyl-1,1'-spirobisindane-6,6'-diol (97.95 area %). The molecular weight of 3,3,3',3'-tetramethyl-1,1'-spirobisindane-6,6'-diol was confirmed by ESI Infusion MS analysis as the expected $Na^+ + 308$. Further confirmation was achieved via accurate mass measurement where the single expected peak observed by HPLC/Infusion ESI MS gave m/z for the measured (331.1664) and calculated mass (331.1674) consistent with the expected $C_{21}H_{24}O_2Na$. As observed in our prior HPLC analysis with UV detector, both the HPLC UV and HPLC/MS analyses of the of 3,3,3',3'-tetramethyl-1,1'-spirobisindane-6,6'-diol sample showed one single peak and its mass spectrum was consistent with molecular weight 308 daltons.

C. Nitration of Recrystallized 3,3,3',3'-Tetramethyl-1,1'-spirobisindane-6,6'-diol Recrystallized (97.95 area %) 3,3,3',3'-tetramethyl-1,1'-spirobisindane-6,6'-diol (3.08 grams) then glacial acetic acid (100 milliliters) were charged to a 0.5 L, glass, 3 neck, round bottom reactor equipped with a chilled (0° C.) overhead condenser and overhead nitrogen inlet (maintained at 0.5 LPM) both attached to a Claisen adaptor, thermometer, magnetic stirring and a ground glass stopper. Stirring was initiated to give a solution at 27° C. Cooling of the solution began with addition of dry ice to an acetone bath placed under the reactor. A mixture of 69% aqueous nitric acid (1.826 grams) and DI water (9.13 grams) in a glass vial was placed on a scale with 3 decimal place accuracy. The cumulative weight of nitric acid added to the reactor with a polypropylene pipette was thus determined by the scale. The aqueous nitric acid was added in 24 approximately equal aliquots over 272 minutes maintaining reaction temperature at 9-19° C. (note: dry ice was added to the acetone bath as needed to cool the reactor contents). HPLC analysis taken after 15 minutes of post reaction at 15.8-15.9° C. demonstrated full conversion of 3,3,3',3'-tetramethyl-1,1'-spirobisindane-6,6'-diol to product (no peak at 5.13 minute retention time), full conversion of mononitro compound (no peak at 6.24 minutes), a minor peak (3.35 area %) at the retention time for the combined tri and tetranitro compounds (6.35 minutes), and major isomeric dinitro compound peaks at 6.06 minutes (40.89 area %) and 7.03 minutes (41.94 area %) totaling to 82.83 area %. After a cumulative 26 minutes of post reaction, the cloudy solution from the reactor was poured into a 1 L glass beaker containing 600 grams of ice and held overnight, slowly melting the ice. A yellow colored precipitate formed. The slurry was vacuum filtered through a medium fritted glass funnel. The cake on the filter was packed to remove as much liquid as possible. The packed cake on the filter was washed in situ with DI water (approximately 50 mL) then dried in the vacuum oven at 50° C. for 16 hours to a constant weight of 3.83 grams of product (96.14% yield uncorrected). HPLC analysis of the damp product cake demonstrated full conversion of 3,3,3',3'-tetramethyl-1,1'-spirobisindane-6,6'-diol to product (no peak at 5.13 minute retention time), full conversion of mononitro compound (no peak at 6.24 minutes), a minor peak (3.70 area %) at the retention time for the combined tri and tetranitro compounds (6.35 minutes), and major isomeric dinitro compound peaks at 6.05 and 7.02 minutes totaling to 83.85 area %. The individual dinitro isomers, 3,3,3',3'-tetramethyl-1,1'-spirobisindane-5,5'-dinitro-6,6'-diol and 3,3,3',3'-tetramethyl-1,1'-spirobisindane-5,7'-dinitro-6,6'-diol were present in approximately equivalent amounts, 40.92 and 42.93 area %. HPLC analysis of the final product recovered after drying in the vacuum oven at 50° C. demonstrated full conversion of 3,3,3',3'-tetramethyl-1,1'-spirobisindane-6,6'-diol to product (no peak at 5.13 minute retention time), a very minor peak (0.18 area %) at the retention time for mononitro compound (6.23 minutes), a minor peak (3.51 area %) at the retention time for the combined tri and tetranitro compounds (6.37 minutes), and major isomeric dinitro compound peaks at 6.04 and 7.01 minutes totaling to 82.89 area %. The individual dinitro isomers, 3,3,3',3'-tetramethyl-1,1'-spirobisindane-5,5'-dinitro-6,6'-diol and 3,3,3',3'-tetramethyl-1,1'-spirobisindane-5,7'-dinitro-6,6'-diol were present in approximately equivalent amounts, 39.79 and 43.10 area %. HPLC and HPLC-MS of various nitrated 3,3,3',3'-tetramethyl-1,1'-spirobisindane-6,6'-diol products provided assignment of nitrated structure versus HPLC retention time. Thus the two separate dinitro isomers, known to be 3,3,3',3'-tetramethyl-1,1'-spirobisindane-5,5'-dinitro-6,6'-diol and 3,3,3',3'-tetramethyl-1,1'-spirobisindane-5,7'-dinitro-6,6'-diol from prior NMR studies gave the expected m/z for $H^+ + 398$ of 399.1559 and 399.1556. The mononitro 3,3,3',3'-tetramethyl-1,1'-spirobisindane-6,6'-diol gave the expected m/z for H⁺+367 of 368.1489. The trinitro 3,3,3',3'-tetramethyl-1,1'-spirobisindane-6,6'-diol gave the expected m/z for H⁺+443 of 444.1407 while 3,3,3',3'-tetramethyl-1,1'-spirobisindane-5,5',7,7'-tetranitro-6,6'-diol gave the expected m/z for NH₄⁺+488 of 506.1523.

D. Chemical Hydrogenation of 3,3,3',3'-Tetramethyl-1,1'-spirobisindane-5,5'-dinitro-6,6'-diol and 3,3,3',3'-Tetramethyl-1,1'-spirobisindane-5,7'-dinitro-6,6'-diol Isomer Mixture The isomeric mixture of 3,3,3',3'-tetramethyl-1,1'-spirobisindane-5,5'-dinitro-6,6'-diol and 3,3,3',3'-tetramethyl-1,1'-spirobisindane-5,7'-dinitro-6,6'-diol was used for chemical hydrogenation without further purification. The tin (II) chloride and aqueous hydrochloric acid method was employed for the chemical hydrogenation. In the specific reaction, the isomeric mixture of 3,3,3',3'-tetramethyl-1,1'-spirobisindane-5,5'-dinitro-6,6'-diol and 3,3,3',3'-tetramethyl-1,1'-spirobisindane-5,7'-dinitro-6,6'-diol employed came from two separate nitration reactions to provide the 3.98 grams total (0.01 mole, 0.02 NO₂ equivalent): 3.36 grams containing 39.79 and 43.10 HPLC area % of the two dinitro isomers and 0.62 gram containing 40.28 and 42.61 HPLC area % purity (2 dinitro isomers). The isomeric 3,3,3',3'-tetramethyl-1,1'-spirobisindane-5,5'-dinitro-6,6'-diol and 3,3,3',3'-tetramethyl-1,1'-spirobisindane-5,7'-dinitro-6,6'-diol mixture, tetrahydrofuran (20 milliliters) and methanol (20 milliliters) were charged in the indicated order to a 0.1 L, glass, 3 neck, round bottom reactor equipped with a chilled (0° C.) overhead condenser, thermometer, magnetic stirring and a ground glass stopper. Stirring was initiated to give a slurry at 24.5° C. Two minutes later, solid tin (II) chloride dihydrate (13.68 grams, 0.061 mole) was added to the stirred slurry using a polypropylene funnel [note: calculation for tin (II) chloride dihydrate=3.30×0.02 equivalents NO₂×225.65 grams/mole=13.68 grams]. An exotherm to 26.5° C. resulted and cooling of the reactor exterior with a fan commenced until 9 minutes later the temperature dropped to 25° C. The color of the slurry concomitantly turned from amber to a light golden color. The aqueous concentrated hydrochloric acid (6.0 milliliters) was added to the reactor as drops with a polypropylene pipette [note: calculation for hydrochloric acid=(0.0606 mole×36.51 grams/mole×100/37 concentration=6.0 milliliters)]. The nine individual additions were approximately equal volume with reaction temperature maintained at 25-29° C. Four minutes after completion of the HCl(aq) addition, a heating mantle was placed under the reactor followed by gentle heating of the 28.5° C. slurry in the over the next 37 minutes to a 64° C. hazy brown colored solution. After 16.17 hours at 64° C. HPLC analysis of the light amber colored transparent solution demonstrated full conversion of 3,3,3',3'-tetramethyl-1,1'-spirobisindane-5,5'-dinitro-6,6'-diol and 3,3,3',3'-tetramethyl-1,1'-spirobisindane-5,7'-dinitro-6,6'-diol to approximately equivalent amounts, 39.24 and 42.67 area %, of 3,3,3',3'-tetramethyl-1,1'-spirobisindane-5,5'-diamino-6,6'-diol and 3,3,3',3'-tetramethyl-1,1'-spirobisindane-5,7'-diamino-6,6'-diol. Additionally present is a minor peak (4.25 area %) at 1.54 minutes which was identified by HPLC-MS analysis as a 3,3,3',3'-tetramethyl-1,1'-spirobisindanemonoaminotriol wherein one amino group in 3,3,3',3'-tetramethyl-1,1'-spirobisindane-5,5'-diamino-6,6'-diol and/or 3,3,3',3'-tetramethyl-1,1'-spiro bisindane-5,7'-diamino-6,6'-diol has been replaced by a hydroxyl group. Possible isomeric structures include:

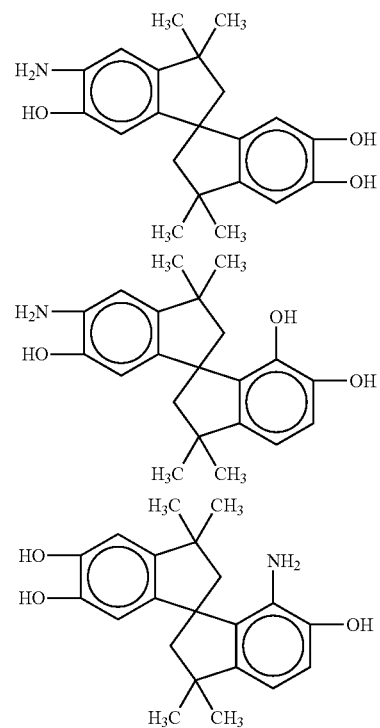

Minor amounts, 1.29 and 6.39 area %, of isomeric dimerization products formed via coupling with loss of NH₃ are observed at HPLC retention times of 1.83 and 1.94 minutes, respectively. Some possible isomeric structures include:

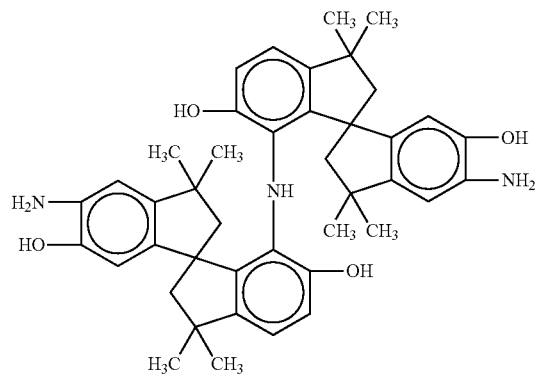

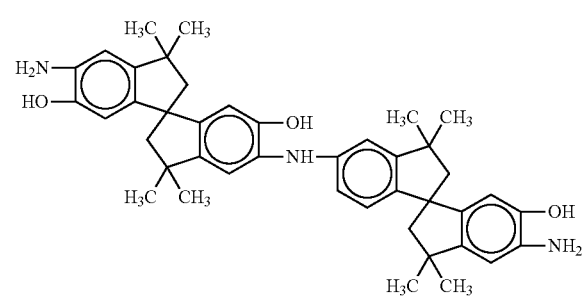

-continued

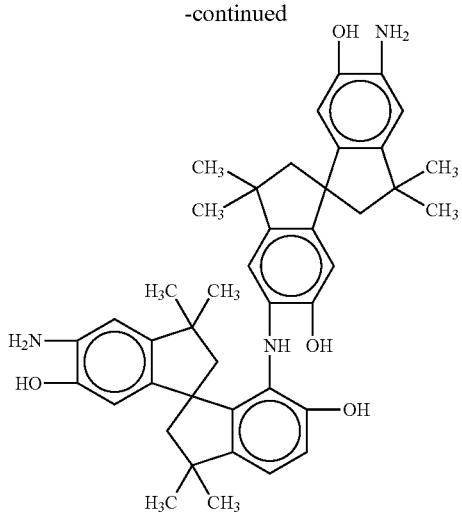

A peak at a retention time of 3.94 minutes integrating at 4.51 area % is of unknown structure and was not observed in the HPLC-MS analyses. After cooling, ethyl acetate (40 milliliters) and DI water (40 milliliters) were added to the stirred 25° C. solution in the reactor. Adjustment of pH commenced by adding portions of solid potassium carbonate. Once the pH (paper) reached the 6 to 7 range, the mixture had thickened due to precipitate formation and was thinned by addition of additional ethyl acetate (40 milliliters) and DI water (40 milliliters). Potassium carbonate was added to a pH of 9 followed by additional ethyl acetate (40 milliliters) and DI water (40 milliliters). The slurry was transferred into a heavy wall polypropylene bottle and centrifuged at 2100 RPM for 30 minutes. The resultant biphasic liquid was decanted from the centrifuge bottle into a glass separatory funnel. The precipitate in the centrifuge bottle was vigorously mixed with fresh ethyl acetate (75 milliliters) and centrifugation repeated followed by decantation of the separated liquid into the separatory funnel. The aqueous layer in the separatory funnel was separated off, re-extracted with ethyl acetate (50 milliliters) and discarded to waste while the combined ethyl acetate extracts were vacuum filtered through a bed of granular anhydrous sodium sulfate supported in a medium fritted glass funnel using a side arm glass vacuum flask. Additional ethyl acetate was used to wash product from the bed on the filter into the filtrate. The dry filtrate was rotary evaporated to final conditions of 70° C. and 1.6 mm Hg to give a light brown colored solid weighing 3.32 grams (98.10% yield uncorrected). After cooling to room temperature, dichloromethane (50 milliliters) was added to the solid immediately forming a clear, amber colored solution which then began to crystallize within 30 seconds. Heating of the mixture to boiling did not put the crystalline product back into solution. After standing overnight, the crystalline slurry was filtered over a medium fritted glass funnel and then dried for 22 hours in the vacuum oven at 50° C. to give a constant weight of 2.71 grams (80.08% yield uncorrected) of light tan colored microcrystalline powder (2.32 grams was recovered into bottle from the fritted glass filter). The recovered product and fresh dichloromethane (20 milliliters) were combined and magnetically stirred as a slurry for 22 hours. The crystalline slurry was filtered over a medium fritted glass funnel and then dried for 20.5 hours in the vacuum oven at 50° C. to give a constant weight of 2.08 grams (61.46% yield uncorrected) of off white microcrystalline powder. HPLC analysis of a sample of the damp product on the fritted glass funnel demonstrated full conversion of 3,3,3',3'-tetramethyl-1,1'-spirobisindane-5,5'-dinitro-6,6'-diol and 3,3,3',3'-tetramethyl-1,1'-spirobisindane-5,7'-dinitro-6,6'-diol to approximately equivalent amounts, 45.66 and 49.43 area %, of 3,3,3',3'-tetramethyl-1,1'-spirobisindane-5,5'-diamino-6,6'-diol and 3,3,3',3'-tetramethyl-1,1'-spirobisindane-5,7'-diamino-6,6'-diol (Appendix XVII). The proposed pair of isomeric 3,3,3',3'-tetramethyl-1,1'-spirobisindanemononitromonoaminodiol intermediates were not observed at the typical retention times of 1.92 and 3.01 minutes. A minor peak (2.98 area %) was observed at 1.56 minutes for 3,3,3',3'-tetramethyl-1,1'-spirobisindanemonoaminotriol. Very minor amounts, 0.33 and 0.44 area %, of isomeric dimerization products were observed at retention times of 1.87 and 1.97 minutes, respectively. The peak of unknown structure was observed at a retention time of 3.94 minutes integrating at 1.20 area %. HPLC analysis of a sample of the 2.71 grams of product crystallized from dichloromethane— damp product and dried in the vacuum oven demonstrated no significant changes from the damp product before drying: 45.70 and 49.73 area % of 3,3,3',3'-tetramethyl-1,1'-spirobisindane-5,5'-diamino-6,6'-diol and 3,3,3',3'-tetramethyl-1,1'-spirobisindane-5,7'-diamino-6,6'-diol; 2.55 area % 3,3,3',3'-tetramethyl-1,1'-spirobisindanemonoaminotriol; 0.21 and 0.42 area % isomeric dimerization and 1.40 area % of the peak of unknown structure. HPLC analysis of a sample of the 2.08 grams of dried product from the final extraction with dichloromethane damp product revealed: 48.18 and 47.79 area % of 3,3,3',3'-tetramethyl-1,1'-spirobisindane-5,5'-diamino-6,6'-diol and 3,3,3',3'-tetramethyl-1,1'-spirobisindane-5,7'-diamino-6,6'-diol; 2.02 area % 3,3,3',3'-tetramethyl-1,1'-spirobisindanemonoaminotriol; 0.40 and 0.29 area % isomeric dimerization and 0.84 area % of the peak of unknown structure. Significant additional extraction of the unknown co-product at 3.94 minute retention time resulted (decreased from 1.40 area % in the first dichloromethane extraction to 0.84 area %), but with the previously indicated concurrent loss of the desired isomeric diamine product. The molecular weight of 3,3,3',3'-tetramethyl-1,1'-spirobisindane-5,5'-diamino-6,6'-diol and 3,3,3',3'-tetramethyl-1,1'-spirobisindane-5,7'-diamino-6,6'-diol isomeric mixture was confirmed by accurate mass measurement using ESI Infusion MS analysis as the expected $Na^+$+338. Further confirmation was achieved via accurate mass measurement where Infusion ESI MS gave m/z for the measured (361.1891) and calculated mass (361.1892) consistent with the expected $C_{21}H_{26}N_2O_2Na$. As observed in the prior HPLC analyses with UV detector both the HPLC UV and HPLC/MS analyses showed the expected pair of isomer peaks and its mass spectrum was consistent with molecular weight 338 daltons. Also as observed in the prior HPLC analyses with UV detector for both the HPLC UV and HPLC/MS analyses 3,3,3',3'-tetramethyl-1,1'-spirobisindanemonoaminotriol gave the expected peak leading shoulder on the longer retention time diamino isomer peak, with HPLC-MS analysis giving the expected m/z=339. Likewise a pair of minor peaks previously observed in our prior HPLC analyses with UV detector were additionally observed in both the HPLC UV and HPLC/MS analyses and are speculated to be a result of dimer formation probably via elimination of $NH_3$ as indicted by the measured m/z=659.

E. Polyimide Synthesis: Copolymerization of 3,3,3',3'-Tetramethyl-1,1'-spirobisindane-5,5'-diamino-6,6'-diol and 3,3,3',3'-Tetramethyl-1,1'-spirobisindane-5,7'-diamino-6,6'-diol Isomer Mixture and 3,3',4,4'-Biphenyltetracarboxylic dianhydride The isomeric mixture of 3,3,3',3'-tetramethyl-1,1'-spirobisindane-5,5'-diamino-6,6'-diol and 3,3,3',3'-tetramethyl-1,1'-spirobisindane-5,7'-diamino-6,6'-diol was reacted with 3,3',4,4'-biphenyltetracarboxylic dianhydride under relatively mild conditions to form the co-polyamic acid followed by more rigorous conditions with removal of water from the condensation reaction to provide the co-polyimide. In the specific reaction, 1.53 grams (from the 2.08 grams of final product) of the isomeric mixture of 3,3,3',3'-tetramethyl-1,1'-spirobisindane-5,5'-diamino-6,6'-diol and 3,3,3',3'-tetramethyl-1,1'-spirobisindane-5,7'-diamino-6,6'-diol (0.0045 mole, 0.009 $NH_2$ equivalent) containing 48.18 and 47.79 HPLC area % of the two diamino isomers was used. The isomeric 3,3,3',3'-tetramethyl-1,1'-spirobisindane-5,5'-diamino-6,6'-diol and 3,3,3',3'-tetramethyl-1,1'-spirobisindane-5,7'-diamino-6,6'-diol mixture, and anhydrous 1-methyl-2-pyrrolidinone (22.5 milliliters, sparged with dry nitrogen) were charged in the indicated order to a 250 milliliter, glass, 3 neck, round bottom reactor containing a magnetic stirring bar and equipped with a Dean Stark trap capped by a spiral condenser which was cooled by a fan. A poly(tetrafluoroethylene) coated thermocouple and ground glass stopper were additionally used. The glassware had been oven dried for >24 hours. A heating mantle was placed under the reactor. The entire apparatus was in a dry nitrogen glove box maintained at <0.25 ppm oxygen. Magnetic stirring commenced providing a 28.3° C. mixture. After 12 minutes, 0.48 gram of 3,3',4,4'-biphenyltetracarboxylic dianhydride was added to the 28.2° C. amber colored solution. After a cumulative 14 minutes, the solution reached a maximum exotherm of 29.7° C. After a cumulative 22 minutes, the amber colored hazy mixture had cooled to 29.3° C., and 0.43 gram of 3,3',4,4'-biphenyltetracarboxylic dianhydride was added. After a cumulative 28 minutes, the hazy mixture reached a maximum exotherm of 30.2° C. After a cumulative 42 minutes, the amber colored hazy mixture had cooled to 29.3° C., and the remaining 3,3',4,4'-biphenyltetracarboxylic dianhydride was added. After a cumulative 61 minutes, the temperature had declined to 28.7° C. and then to 28.2° C. after a cumulative 2 hours. The reaction was maintained under ambient conditions for the next 20.4 hours and 4 minutes later, anhydrous toluene (18 milliliters) and anhydrous pyridine (4.5 milliliters) were added to the 28.3° C. hazy amber colored mixture. Heating commenced and after 13 minutes, 90.5° C. was reached. After a cumulative 47 minutes, 136.9° C. was reached. After a cumulative 64 minutes, 150.4° C. was reached and 8 milliliters of cloudy liquid was condensed into the Dean Stark trap from the amber colored refluxing solution. Heating continued to 160° C. with the reaction maintained therein for the next 23.7 hours. A total of 13.8 milliliters of cloudy liquid was condensed into the Dean Stark trap from the amber colored refluxing solution. Heating was shut off and the heating mantle removed from under the reactor to facilitate cooling. The amber colored 28.1° C. solution from glove box was transferred into a 100 milliliter single neck round bottom flask and rotary evaporated using a maximum oil bath temperature of 130° C. to 2 mm Hg final vacuum. The resultant tan colored powder was combined with methanol (50 milliliters) and magnetically stirred at room temperature for 6 hours in the sealed 100 milliliter flask. Gravity filtration on paper was completed to give a light tan colored powder and a light yellow colored filtrate which was discarded to waste. The powder was removed from the filter paper and added back into the 100 milliliter flask along with 70 milliliters of fresh methanol. The flask was sealed and the mixture magnetically stirred for stirred 16 hours at room temperature. Gravity filtration on paper was again completed giving a light tan colored powder and a lighter yellow colored filtrate which was discarded to waste. The damp product on the filter paper was dried in the vacuum oven for 22 hours at 50° C. to give 2.45 grams of a light tan colored powder. FTIR spectrophotometric analysis of a potassium bromide pellet of the polyimide revealed strong broad hydroxyl group absorbance at 3421.4 $cm^{-1}$. Additionally observed were medium aryl C—N stretching absorbance at 1293.1 $cm^1$; strong, broad carbonyl absorbance associated with a cyclic five membered ring imide at 1719 cm with a shoulder at 1786.8 $cm^{-1}$; and medium absorbances associated with the aromatic ring at 1494.3 and 1616.2 $cm^{-1}$. Differential scanning calorimetry (DSC) analysis of a portion (9.0 milligrams) of the polyimide from copolymerization of isomeric 3,3,3',3'-tetramethyl-1,1'-spirobisindane-5,5'-diamino-6,6'-diol and 3,3,3',3'-tetramethyl-1,1'-spirobisindane-5,7'-diamino-6,6'-diol with 3,3',4,4'-biphenyltetracarboxylic dianhydride was completed using a rate of heating of 7° C. per minute from 0° C. to 425° C. under a stream of nitrogen flowing at 35 cubic centimeters per minute. No thermal events were detected in the DSC analysis other than a gradual exothermic increase with an onset of 334.3° C. Thermogravimetric analysis (TGA) was conducted under 60 cubic centimeters per minute of nitrogen flow by heating a 2.576 milligram sample from 10 to 500° C. at a rate of 10° C. per minute. A decomposition temperature (Td) of 453° C. was detected. Molecular weight data from size exclusion chromatographic (SEC) analysis of the polyimide relative to polystyrene standards is given in Table I. Precision was determined by analyzing the samples in duplicate from two separate preparations. The data in Table 1 are the average of these measurements and the standard deviation of the values are given in the table. The first injection of the polyimide has been discarded from average and standard deviation calculations due to adsorption. There is high variability in the Mz of the polyimide, but this is due to fronting at the high molecular weight end of the chromatogram (19-21 milliliter retention volume) that complicates integration.

TABLE I

|  | Mn (g/mole) | Mw (g/mole) | Mw/Mn | Mp (g/mole) | Mz (g/mole) |
| --- | --- | --- | --- | --- | --- |
|  | 4512 | 17542 | 3.888 | 15913 | 71888 |
|  | 5171 | 17633 | 3.41 | 15949 | 63483 |
|  | 5173 | 17273 | 3.339 | 15948 | 51503 |
| Average | 4952 | 17483 | 3.546 | 15937 | 62291 |
| Std. Dev. | 381.1 | 187.2 | 0.299 | 20.50 | 10244.6 |
| RSD % | 7.69 | 1.07 | 8.42 | 0.13 | 16.45 |

F. Polyimide Polycyanate Synthesis

The polyimide isolated from reaction of the isomeric mixture of 3,3,3',3'-tetramethyl-1,1'-spirobisindane-5,5'-diamino-6,6'-diol and 3,3,3',3'-tetramethyl-1,1'-spirobisindane-5,7'-diamino-6,6'-diol with 3,3',4,4'-biphenyltetracarboxylic dianhydride was reacted with cyanogen bromide to convert free phenolic hydroxyl groups to cyanate (cyanuric acid ester) groups. The stoichiometry was based on 2.6879 grams of polyimide containing a theoretical 0.09 —OH equivalent. The polyimide (1.00 gram, 0.00335 —OH equivalent) and anhydrous tetrahydrofuran (100 milliliters) were added to the reactor in the indicated order under overhead dynamic nitrogen flow (0.5 liter per minute) and stirred with heating to 50° C. to give a transparent light amber colored solution. A 500 milliliter, glass, 3 neck, round bottom reactor equipped with a chilled (0° C.) overhead condenser, overhead nitrogen inlet, ground glass stopper, thermometer, and magnetic stirring was used. A thermostatically controlled heating mantle placed under the reactor was used. Weights were on a 3 place balance which was shielded from air currents in the vented hood. The heating mantle was removed and the reactor was seated in a glass evaporating dish which served as a cooling bath. Acetone and dry ice were used to cool the stirred solution in the reactor. Once the solution was cooled to −3° C., cyanogen bromide (0.426 gram, 0.004022 mole) [calculation: 1.20×(1.00 g/2.6879 g)×105.92 g/mole×0.009 —OH eq=0.426 gram] was added under dynamic nitrogen flow to the stirred solution in the reactor. The clear amber colored solution immediately dissolved the cyanogen bromide. Triethylamine (0.407 gram, 0.004022 mole) [calculation: 1.20×(1.00 g/2.6879 g)×101.19 g/mole×0.009 —OH eq=0.407 gram] was added to the reactor in two approximately equal aliquots. The first triethylamine aliquot was added to the stirred solution held at −4° C. using a polypropylene syringe. Four minutes later, the second aliquot was added to the stirred −4° C. solution. After 10 minutes a hazy amber colored solution had formed at 0° C. One minute later the hazy solution was at −3° C. due to additional dry ice added to the acetone cooling bath. After an additional 19 minutes the hazy solution was at +1° C. and work-up commenced one minute later. The reactor contents were poured into a 2 L glass beaker containing a magnetically stirred mixture of DI water (100 milliliters) and dichloromethane (250 milliliters). After 2 minutes the mixture was poured into a 2 L glass separatory funnel and the resolved aqueous phase removed and discarded to waste. After a cumulative 9 minutes, fresh DI water (50 milliliters) was added to the organic solution in the separatory funnel and vigorously mixed. After a cumulative 21 minutes, the resolved aqueous phase was removed and discarded to waste. The recovered organic phase was passed through a bed of anhydrous granular sodium sulfate supported in a medium fitted glass funnel and vacuum flask. Additional dichloromethane was used to wash the sodium sulfate bed and remove any entrained product into the filtrate. The dry filtrate was rotary evaporated using a maximum oil bath temperature of 50° C. to 2 mm Hg giving a brown colored powder product. Additional drying was completed for 16 hours in the vacuum oven at 25° C. to provide 1.21 grams of polyimide polycyanate as a brown colored powder. FTIR spectrophotometric analysis of a potassium bromide pellet of the polyimide polycyanate revealed disappearance of the hydroxyl group absorbance and appearance of sharp, strong cyano group stretching absorbance at 2264.9 and 2207.9 $cm^{-1}$. Additionally observed were medium aryl C—N stretching absorbance at 1288 $cm^{-1}$, broad carbonyl absorbance associated with a cyclic five membered ring imide at 1733.0 $cm^{-1}$ with a shoulder at 1786 $cm^{-1}$, medium absorbance associated with a cyclic imide at 808 $cm^{-1}$, and medium absorbances associated with the aromatic ring at 1498 and 1622 $cm^{-1}$. TGA was conducted under 60 cubic centimeters per minute of nitrogen flow by heating a 3.673 milligram sample from 10 to 500° C. at a rate of 10° C. per minute. A Td temperature of 445° C. was detected.

Example 2—Thermal Cyclotrimerization (Curing) of Polyimide Polycyanate

DSC analysis of a portion (9.5 milligrams) of the polyimide polycyanate was completed using a rate of heating of 7° C. per minute from 0° C. to 425° C. under a stream of nitrogen flowing at 35 cubic centimeters per minute. A minor, exotherm was detected with a 135.6° C. onset, a 164.7° C. midpoint, and a 182.8° C. endpoint accompanied by an enthalpy of 2.50 joules per gram. A single exotherm attributed to cyclotrimerization to the polytriazine was detected with a 184.1° C. onset, a 236.7° C. midpoint, and a 304.6° C. end accompanied by an enthalpy of 41.1 joules per gram. FTIR spectrophotometric analysis of a potassium bromide pellet of the cyclotrimerized polyimide polycyanate recovered from the DSC analysis revealed disappearance of the cyano group stretching absorbance at 2207.9 $cm^{-1}$ with only a trace of the absorbance at 2264.9 $cm^{-1}$ remaining Additionally observed were medium aryl C—N stretching absorbance at 1268 $cm^{-1}$, strong, broad carbonyl absorbance associated with a cyclic five membered ring imide at 1730 $cm^{-1}$ with a shoulder at 1787 $cm^{-1}$; medium absorbance associated with a cyclic imide at 808 $cm^{-1}$; and medium absorbances associated with the aromatic ring at 1499 and 1622 $cm^{-1}$.

Example 3—Etherification of 3,3,3',3'-Tetramethyl-1,1'-spirobisindane-5,5'-dinitro-6,6'-diol with Ethylbromoacetate In a dry nitrogen glove box (<0.25 ppm oxygen), ethylbromoacetate (98%) (3.67 grams, 0.022 mole) then anhydrous N,N-dimethylformamide (200 milliliters) were added to a polypropylene bottle and sealed. Potassium carbonate (≥98% %, powder, −325 mesh) (5.53 grams (0.04 mole), potassium iodide (anhydrous beads, −10 mesh, 99.998%) (0.166 gram, 0.001 mole) and 18-crown-6 (≥99%) (0.264 gram, 0.001 mole) were added to a second polypropylene bottle and sealed. A 500 milliliter, glass, 3 neck, round bottom reactor which had been pre-dried in the oven (>24 hours, 100° C.) was equipped with a chilled (0° C.) overhead condenser and overhead nitrogen inlet (0.5 LPM) both attached to a Claisen adaptor, thermometer, mechanical stirring (variable speed, glass shaft, poly(tetrafluoroethylene) paddle). Under dynamic nitrogen flow isomeric 3,3,3',3'-tetramethyl-1,1'-spirobisindane-5,5'-dinitro-6,6'-diol and 3,3,3',3'-tetramethyl-1,1'-spirobisindane-5,7'-dinitro-6,6'-diol present in approximately equivalent amounts, 41.71 and 43.67 area % (3.98 grams, 0.01 mole, 0.02 —OH equivalent) was added to the reactor with a polypropylene funnel followed by the potassium carbonate, potassium iodide and 18-crown-6 mixture and then the ethylbromoacetate solution in N,N-dimethylformamide Stirring was initiated giving an amber colored slurry at 27° C. Heating commenced using a heating mantle placed under the reactor which was cycled with a pair of cooling fans on the reactor exterior. After 18 minutes the reaction mixture reached 65° C. and a sample was taken for HPLC analysis demonstrating complete conversion of the 3,3,3',3'-tetramethyl-1,1'-spirobisindane-5,5'-dinitro-6,6'-diol and 3,3,3',3'-tetramethyl-1,1'-spirobisindane-5,7'-dinitro-6,6'-diol mixture to the corresponding isomeric carboxylic acid ethyl ester methyl ethers in approximately equivalent amounts, 45.81 and 46.58 area %. After an additional 10 minutes at 65° C. the stirred, orange amber colored slurry was cooled to room temperature by shutting off heating, removal of the heating mantle and cooling using a cooling fan on the reactor exterior. Once at 25° C., the mixture in the reactor was vacuum filtered over a bed of diatomaceous earth supported in a medium fritted glass funnel. Product entrained in the diatomaceous earth was washed into the filtrate using fresh N,N-dimethylformamide. The filtrate was rotary evaporated to 1.26 mm Hg at a maximum oil bath temperature of 70° C. The transparent amber orange colored tacky solid which was recovered weighed 9.79 grams. This product was dissolved in dichloromethane (150 grams), added to a separatory funnel and doubly washed with DI water (50 milliliters per wash). The recovered organic layer was vacuum filtered through a bed of anhydrous sodium sulfate supported on a medium fritted glass funnel. The filtrate was rotary evaporated to 1.50 mm Hg at a maximum oil bath temperature of 65° C. giving an orange colored solid weighing 5.80 grams. HPLC analysis of a portion of the product was completed demonstrating 45.89 and 46.98 HPLC area % isomeric carboxylic acid ethyl ester methyl ethers.

Example 4—Carboxylic Acid Ester Ether Functionalized Spirobisindane Polyimide

In a dry nitrogen glove box (<1 ppm oxygen), a portion of the polyimide from Example 1E (1.00 gram, 0.003348 —OH equivalent based on 2.6879 grams containing a theoretical 0.09 —OH equivalent), potassium carbonate (≥98% %, powder, −325 mesh) (0.962 gram, 0.00696 mole), potassium iodide (anhydrous beads, −10 mesh, 99.998%) (0.056 gram (0.0003348 mole), 18-crown-6 (≥99%) (0.0885 gram (0.0003348 mole), ethylbromoacetate (98%) (0.62 gram, 0.00368 mole) then anhydrous N,N-dimethylformamide (35 milliliters) were added into a reactor in the indicated order. A 250 milliliter, glass, 3 neck, round bottom reactor containing a magnetic stirring bar and equipped with a spiral condenser which was cooled by a fan was used. A poly (tetrafluoroethylene) coated thermocouple and ground glass stopper were additionally used. The glassware had been oven dried at 100° C. for >24 hours. A heating mantle was placed under the reactor. Magnetic stirring commenced providing a 28.3° C. mixture. After stirring for 27 minutes the polyimide appeared to be completely dissolved in the amber colored slurry, then heating commenced. After 13 minutes of heating the slurry reached 65° C. After holding at 65° C. for 102 minutes heating was shut off and the heating mantle removed and the reactor was sealed shut with ground glass stoppers and removed from the glove box.

After cooling for 22 minutes, the amber colored slurry was vacuum filtered over a bed of diatomaceous earth supported in a medium fritted glass funnel. Product entrained in the diatomaceous earth was washed into the filtrate using fresh N,N-dimethylformamide. The filtrate was rotary evaporated to 1.6 mm Hg at a maximum oil bath temperature of 100° C. giving 1.62 grams of a tan colored powder. The powder was combined with methanol (75 milliliters) and magnetically stirred at room temperature for 22 hours in the sealed 250 milliliter flask used for the rotary evaporation. Gravity filtration on paper was completed to give a light tan colored powder and a light yellow colored filtrate which was discarded to waste. The air dried powder was removed from the filter paper and added back into the 250 milliliter flask along with 50 milliliters of fresh methanol. The flask was sealed and the mixture magnetically stirred for stirred 24 hours at room temperature. Gravity filtration on paper was again completed giving a light tan colored powder and a very pale yellow colored filtrate which was discarded to waste. The damp product on the filter paper was dried in the vacuum oven at 50° C. to give 1.02 grams of a light tan colored powder.

FTIR spectrophotometric analysis of a potassium bromide pellet of the carboxylic acid ethyl ester methyl ether functionalized spirobisindane polyimide revealed disappearance of the hydroxyl group absorbance at 3421.4 cm$^{-1}$. Additionally observed were medium aryl C—N stretching absorbance at 1298.6 cm$^{-1}$; strong, broad carbonyl absorbance associated with a cyclic five membered ring imide at 1723.8 cm$^{-1}$ with a shoulder at 1784.0 cm$^{-1}$ and with a shoulder at 1764.0 resulting from carbonyl stretch of the ester; ester carbonyl-oxygen (O=C—O—C) stretching vibration at 1193.6 cm$^{-1}$; carbonyl-oxygen stretching vibration (O=C—O—C) at 1031.2 cm$^{-1}$; and medium absorbances associated with the aromatic ring at 1496.1 and 1615.5 cm$^{-1}$. DSC analysis of a portion (6.7 milligrams) of the carboxylic acid ethyl ester methyl ether functionalized spirobisindane polyimide was completed using a rate of heating of 7° C. per minute from 0° C. to 400° C. under a stream of nitrogen flowing at 35 cubic centimeters per minute. A glass transition temperature was detected at 229° C. followed by an exothermic increase with an onset of 293° C. then exothermic decomposition with an onset of 324° C. TGA was conducted under 60 cubic centimeters per minute of nitrogen flow by heating a 3.151 milligram sample from 10 to 500° C. at a rate of 10° C. per minute. A Td temperature of 355° C. was detected.

Example 5—High Molecular Weight PIM Polyimide Polycyanate Synthesis

A. Chromatographic Purification of Isomeric Mixture of 3,3,3',3'-Tetramethyl-1,1'-spirobisindane-5,5'-dinitro-6,6'-diol and 3,3,3',3'-Tetramethyl-1,1'-spirobisindane-5,7'-dinitro-6,6'-diol A silica gel column was prepared by making a slurry of silica gel (Merck, grade 9385, 230-400 mesh, 60 Å) in HPLC grade acetonitrile and pouring into a glass column with a fritted glass support. The bed of silica gel measured 26.7 cm height×4 cm diameter. A filter paper circle topped the silica gel bed. Isomeric mixture of 3,3,3',3'-tetramethyl-1,1'-spirobisindane-5,5'-dinitro-6,6'-diol and 3,3,3',3'-tetramethyl-1,1'-spirobisindane-5,7'-dinitro-6,6'-diol prepared in the manner of Example 1 D (2.01 grams) was dissolved in warm acetonitrile (40 milliliters). The warm solution was then applied to the silica gel column. After passing a void volume (180 milliliters) of acetonitrile through the column an additional 149 milliliters of acetonitrile containing product was collected and discarded. The next 110 milliliters of acetonitrile eluent was collected as an amber colored solution and gave 0.88 gram of a pale purple colored solid after rotary evaporation using a 50° C. maximum oil bath temperature. After drying for 21 hours in the vacuum oven at 50° C., 0.82 gram of pale purple colored solid was obtained.

B. Polyimide Synthesis Using Chromatographically Purified Isomeric Mixture of 3,3,3',3'-Tetramethyl-1,1'-spirobisindane-5,5'-dinitro-6,6'-diol and 3,3,3',3'-Tetramethyl-1,1'-spirobisindane-5,7'-dinitro-6,6'-diol Chromatographically purified isomeric mixture of 3,3,3',3'-tetramethyl-1,1'-spirobisindane-5,5'-diamino-6,6'-diol and 3,3,3',3'-tetramethyl-1,1'-spirobisindane-5,7'-diamino-6,6'-diol (0.0045 mole, 0.009 NH$_2$ equivalent) containing 64.51 and 30.54 HPLC area % of the two diamino isomers (0.82 gram) was used. The isomeric 3,3,3',3'-tetramethyl-1,1'-spirobisindane-5,5'-diamino-6,6'-diol and 3,3,3',3'-tetramethyl-1,1'-spirobisindane-5,7'-diamino-6,6'-diol mixture, and anhydrous 1-methyl-2-pyrrolidinone (99.5%) (12.1 milliliters, sparged with dry nitrogen) were charged in the indicated order to a 100 milliliter, glass, 3 neck, round bottom reactor containing a magnetic stirring bar and equipped with a Dean Stark trap capped by a spiral condenser which was cooled by a fan. A poly(tetrafluoroethylene) coated thermocouple and ground glass stopper were additionally used. The glassware had been oven dried for >24 hours. A heating mantle was placed under the reactor. The entire apparatus was in a dry nitrogen glove box maintained at <0.25 ppm oxygen. Magnetic stirring commenced providing a 28.3° C. mixture. After 2 minutes, 3,3',4,4'-biphenyltetracarboxylic dianhydride (0.71 gram of 0.002423 mole, 0.00485 carboxylic anhydride equivalent) was added to the 28.5° C. amber colored solution. Eleven minutes after the addition, the dark amber colored solution reached a maximum exotherm of 30° C. The reaction was maintained under ambient conditions for the next 17.6 hours with the temperature declining to 27.8° C. Anhydrous toluene (99.8%) (9.7 milliliters) and anhydrous pyridine (99.8%) (2.4 milliliters) were added and heating commenced. After 76 minutes, 155.9° C. was reached and 6.5 milliliters of cloudy liquid was condensed into the Dean Stark trap from the light amber colored refluxing solution. After a cumulative 119 minutes, 160° C. was reached and 7.8 milliliters of cloudy liquid was condensed into the Dean Stark trap. The reaction was maintained at 160° C. for the next 22.3 hours. A total of 7.9 milliliters of cloudy liquid was condensed into the Dean Stark trap from the amber colored refluxing solution. Heating was shut off and the heating mantle removed from under the reactor to facilitate cooling. The amber colored 28° C. solution from glove box was transferred into a 250 milliliter single neck round bottom flask and rotary evaporated using a maximum oil bath temperature of 130° C. to 1 mm Hg final vacuum. The resultant transparent, amber colored film-like product (1.86 grams) was chopped into fine pieces and combined with methanol (100 milliliters) and magnetically stirred at room temperature for 20 hours in the sealed 250 milliliter flask. Gravity filtration on paper was completed to give film-like pieces of product and a pale yellow colored filtrate which was discarded to waste. The product was removed from the filter paper and added back into the 250 milliliter flask along with 150 milliliters of fresh methanol. The flask was sealed and the mixture magnetically stirred for stirred 22.6 hours at room temperature. Gravity filtration on paper was again completed giving film-like pieces of product and a colorless filtrate which was discarded to waste. Molecular weight data from SEC analysis of the polyimide relative to polystyrene standards is given in Table II. The method of Example 1E. was used for the SEC and TGA analyses. TGA of a 2.942 milligram sample gave a Td temperature of 436° C.

TABLE II

| | |
|---|---|
| Mn (g/mole) | 17,582 |
| Mw (g/mole) | 83,648 |
| Mw/Mn | 4.7576 |
| Mp (g/mole) | 58,970 |
| Mz (g/mole) | 5,611,595 |

C. Polyimide Polycyanate Synthesis

The high molecular weight polyimide isolated from reaction of the chromatographically purified isomeric mixture of 3,3,3',3'-tetramethyl-1,1'-spirobisindane-5,5'-diamino-6,6'-diol and 3,3,3',3'-tetramethyl-1,1'-spirobisindane-5,7'-diamino-6,6'-diol with 3,3',4,4'-biphenyltetracarboxylic dianhydride from B. above was reacted with cyanogen bromide to convert free phenolic hydroxyl groups to cyanate (cyanuric acid ester) groups. The polyimide (0.75 gram, 0.00252 —OH equivalent theoretical) and anhydrous tetrahydrofuran (75 milliliters) were added to the reactor in the indicated order under overhead dynamic nitrogen flow (0.5 liter per minute) and stirred at room temperature to give a transparent light green colored solution. The tetrahydrofuran used was inhibitor free and dried in the glove box over heat activated molecular sieves. A 250 milliliter, glass, 3 neck, round bottom reactor equipped with a chilled (0° C.) overhead condenser, overhead nitrogen inlet, ground glass stopper, thermometer, and magnetic stirring was used. Weights were on a 3 place balance which was shielded from air currents in the vented hood. After forming the polyimide solution, the reactor was seated in a glass evaporating dish which served as a cooling bath. Acetone and dry ice were used to cool the stirred solution in the reactor. Once the solution was cooled to 0° C., cyanogen bromide (0.32 gram, 0.00302 mole) was added under dynamic nitrogen flow to the stirred solution in the reactor. The clear light green colored solution immediately dissolved the cyanogen bromide. Triethylamine (0.306 gram, 0.00302 mole) was added to the stirred −3° C. solution using a polypropylene syringe. After one minute a hazy light green amber colored mixture had formed at −1.5° C. The hazy mixture was held for a total of 30 minutes after the addition of the triethylamine while maintaining the temperature between −2 to −0.5° C. and work-up commenced one minute later. The reactor contents were poured into a 2 L glass beaker containing a magnetically stirred mixture of DI water (100 milliliters) and dichloromethane (250 milliliters). After one minute the mixture was poured into a 2 L glass separatory funnel and the resolved aqueous phase removed and discarded to waste. After a cumulative 6 minutes, fresh DI water (50 milliliters) was added to the organic solution in the separatory funnel and vigorously mixed followed by application of a static electrical discharge to the glass surface of the separatory funnel which instantly resolved the aqueous and organic phases. After a cumulative 9 minutes, the resolved aqueous phase was removed and discarded to waste. The recovered organic phase was passed through a bed of anhydrous granular sodium sulfate supported in a medium fitted glass funnel and vacuum flask. Additional dichloromethane was used to wash the sodium sulfate bed and remove any entrained product into the filtrate. The dry filtrate was rotary evaporated using a maximum oil bath temperature of 50° C. to 2 mm Hg giving a mass of transparent light amber colored product which peeled from the glass walls of the rotary evaporation flask as a film. Additional drying was completed for 50 hours in the vacuum oven at 25° C. to provide 0.95 grams of polyimide polycyanate as a film. FTIR spectrophotometric analysis of a neat piece of the film of the polyimide polycyanate revealed disappearance of the hydroxyl group absorbance and appearance of sharp, strong cyano group stretching absorbance at 2260.9 and 2208.5 $cm^{-1}$. Additionally observed were medium aryl C—N stretching absorbance at 1285 $cm^{-1}$, broad carbonyl absorbance associated with a cyclic five membered ring imide at 1734.3 $cm^{-1}$ with a shoulder at 1782 $cm^{-1}$, medium absorbance associated with a cyclic imide at 808 cm$^{-1}$, and medium absorbances associated with the aromatic ring at 1493 and 1621 cm$^{-1}$. TGA of a 4.040 milligram sample using the method of Example 1E. gave a Td temperature of 436° C.

Example 6—Thermal Cyclotrimerization (Curing) of High Molecular Weight Polyimide Polycyanate DSC analysis of a portion (9.5 milligrams) of the polyimide polycyanate was completed using a rate of heating of 7° C. per minute from 0° C. to 400° C. under a stream of nitrogen flowing at 35 cubic centimeters per minute. A minor, exotherm was detected with a 133.9° C. onset, a 155.0° C. midpoint, and a 184.7° C. endpoint accompanied by an enthalpy of 6.78 joules per gram. A single exotherm attributed to cyclotrimerization to the polytriazine was detected with a 295.3° C. onset, a 339.0° C. midpoint, and a 381.1° C. end accompanied by an enthalpy of 14.4 joules per gram. FTIR spectrophotometric analysis of a potassium bromide pellet of the cyclotrimerized polyimide polycyanate recovered from the DSC analysis revealed disappearance of the cyano group stretching absorbance at 2207.9 cm$^{-1}$ with only a trace of the absorbance at 2264.5 cm$^{-1}$ remaining Additionally observed were medium aryl C—N stretching absorbance at 1266 cm$^{-1}$, strong, broad carbonyl absorbance associated with a cyclic five membered ring imide at 1729 cm$^{-1}$ with a shoulder at 1782 cm$^{-1}$; medium absorbance associated with a cyclic imide at 800 cm$^{-1}$; and medium absorbances associated with the aromatic ring at 1491 and 1617 cm$^{-1}$.

Example 7—Uncured and Thermoset Films from High Molecular Weight PIM Polyimide Polycyanate A portion (0.1075 gram) of the high molecular weight PIM polyimide polycyanate from Example 5 C. and inhibitor-free, anhydrous tetrahydrofuran which had been dried in the glove box over heat activated molecular sieves (9.5 grams) were combined in the glove box in a glass vial, sealed and the vigorously shaken to provide a solution. An aliquot (0.53 gram) of the solution was added to a glass vial along with 0.50 gram of anhydrous tetrahydrofuran. The resultant solution was used to cast a coating on a glass plate with a disposable polypropylene dropper used as the applicator. The glass plate was prepared using a 75×38 mm glass microscopy slide which was scored, then broken in half. The glass substrate to be coated was placed on a metal platform in the glove box. The metal platform was level in both directions as verified by a level kept on the surface of the metal plate. The solution and specified size of the glass plate targeted a 10μ thick film. After one hour of drying the glass plate was removed from the glove box. A light yellow transparent thin film coating was obtained on the glass plate. The coated glass plate was placed on an aluminum plate and introduced into an oven then heated from 21° C. to 250° C. over 92 minutes. After one hour at 250° C. the oven was shut off and the coated glass plate cooled in the oven to provide a medium yellow colored film coating. The coated glass plate was submerged under DI water. After 4 hours in the water bath, a transparent pale yellow colored film de-bonded from the glass plate. A piece could be broken off of the rigid, tough film as it was bent. FTIR spectrophotometric analysis of the neat film confirmed the structure as the cured PIM polyimide polycyanate.

An aliquot (1.0 gram) of the solution was used to cast a coating on a glass plate using the aforementioned method. After one hour of drying the glass plate was removed from the glove box and submerged under DI water. After one hour in the water bath, a transparent light yellow colored film de-bonded from the glass plate. The film was extremely flexible and could be bent over on itself without damage. FTIR spectrophotometric analysis of the neat film confirmed the structure as the uncured PIM polyimide polycyanate.

Example 8—Phenolic Hydroxyl Functional Polyimide Polycyanate Synthesis

A. Scaled-up Polyimide Synthesis Using Chromatographically Purified Isomeric Mixture of 3,3,3',3'-Tetramethyl-1,1'-spirobisindane-5,5'-dinitro-6,6'-diol and 3,3,3',3'-Tetramethyl-1,1'-spirobisindane-5,7'-dinitro-6,6'-diol Chromatographically purified isomeric mixture of 3,3,3',3'-tetramethyl-1,1'-spirobisindane-5,5'-diamino-6,6'-diol and 3,3,3',3'-tetramethyl-1,1'-spirobisindane-5,7'-diamino-6,6'-diol (4.73 grams, 0.0266 NH$_2$ equivalent) and 3,3',4,4'-biphenyltetracarboxylic dianhydride (3.91 grams, 0.0266 carboxylic anhydride equivalent) were reacted to prepare a polyimide using the method of Example 5B. The chromatographically purified isomeric mixture of 3,3,3',3'-tetramethyl-1,1'-spirobisindane-5,5'-diamino-6,6'-diol and 3,3,3',3'-tetramethyl-1,1'-spirobisindane-5,7'-diamino-6,6'-diol was prepared using the method of Example 5A and contained 49.56 and 42.06 HPLC area of the two diamino isomers. The mixture additionally contained two isomeric diamine dimers at 2.31 and 1.11 HPLC area %. No monoaminotriol compounds were detected in the HPLC analysis. TGA was conducted under 60 cubic centimeters per minute of nitrogen flow by heating a 6.2520 milligram sample from 10 to 500° C. at a rate of 10° C. per minute. A Td temperature of 447° C. was detected. Molecular weight data from SEC analysis of the polyimide relative to polystyrene standards is given in Table III. The method of Example 1E was used for the TGA and SEC analyses.

TABLE III

| Mn (g/mole) | 9,766 |
|---|---|
| Mw (g/mole) | 27,187 |
| Mw/Mn | 2.785 |
| Mp (g/mole) | 29,131 |
| Mz (g/mole) | 48,013 |

B. Synthesis of Polyimide Polycyanate with Residual Phenolic Hydroxyl Groups

A portion of the polyimide from A. above was reacted with less than stoichiometric cyanogen bromide to convert a portion of the free phenolic hydroxyl groups to cyanate (cyanuric acid ester) groups. The method of Example 5 C. was used. The polyimide (1.00 gram, 0.00359 —OH equivalent theoretical) dissolved in anhydrous tetrahydrofuran (100 milliliters) was reacted with cyanogen bromide (0.19 gram, 0.00179 mole) and triethylamine (0.20 gram, 0.00198 mole) at −4 to −3° C. solution for 30 minutes. The dry filtrate was rotary evaporated using a maximum oil bath temperature of 50° C. to 2 mm Hg followed by additional drying for 17 hours in the vacuum oven at 70° C. to provide 1.03 grams of phenolic hydroxyl functional polyimide polycyanate. FTIR spectrophotometric analysis of a KBr pellet of the phenolic hydroxyl functional polyimide polycyanate revealed residual hydroxyl group absorbance at 3500 cm$^{-1}$ and appearance of medium cyano group stretching absorbances at 2262 and 2211 cm$^{-1}$. Additionally observed were broad carbonyl absorbance associated with a cyclic five membered ring imide at 1729 cm$^{-1}$ with a shoulder at 1782 cm$^{-1}$, weak absorbance associated with a cyclic imide at 800 cm$^{-1}$, and medium absorbances associated with the aromatic ring at 1491 and 1616 cm$^{-1}$. A ratio of 0.44 for the cyanate absorbance at 2262 cm$^{-1}$ divided by the carbonyl absorbance at 1729 cm$^{-1}$ was measured from the data obtained by the FTIR spectrophotometric analysis. A ratio of 0.40 for the hydroxyl absorbance at 3500 cm$^{-1}$ divided by the carbonyl absorbance at 1729 cm$^{-1}$ was measured from the data obtained by the FTIR spectrophotometric analysis.

C. Synthesis of Polyimide Polycyanate

A portion of the polyimide from A. above was reacted with excess stoichiometric cyanogen bromide to convert all of the free phenolic hydroxyl groups to cyanate (cyanuric acid ester) groups. The method of Example 5 C. was used. The polyimide (1.00 gram, 0.00359 —OH equivalent theoretical) dissolved in anhydrous tetrahydrofuran (100 milliliters) was reacted with cyanogen bromide (0.46 gram, 0.00434 mole) and triethylamine (0.44 gram, 0.00435 mole) at −3 to 0° C. solution for 30 minutes. The dry filtrate was rotary evaporated using a maximum oil bath temperature of 50° C. to 2 mm Hg followed by additional drying for 17 hours in the vacuum oven at 70° C. to provide 1.06 grams of polyimide polycyanate. FTIR spectrophotometric analysis of a KBr pellet of the phenolic hydroxyl functional polyimide polycyanate revealed disappearance of the hydroxyl group absorbance and appearance of strong cyano group stretching absorbances at 2261 and 2208 cm$^{-1}$. Additionally observed were broad carbonyl absorbance associated with a cyclic five membered ring imide at 1733 cm$^{-1}$ with a shoulder at 1783 cm$^{-1}$, weak absorbance associated with a cyclic imide at 802 cm$^{-1}$, and medium absorbances associated with the aromatic ring at 1491 and 1618 cm$^{-1}$. A ratio of 0.70 for the cyanate absorbance at 2261 cm$^{-1}$ divided by the carbonyl absorbance at 1733 cm$^{-1}$ was measured from the data obtained by the FTIR spectrophotometric analysis.

Example 9—Preparation of Catalyzed and Uncatalyzed Thin Films Using Polyimide Polycyanate with Residual Phenolic Hydroxyl Groups and Curing A. Uncatalyzed Polyimide Polycyanate with Residual Phenolic Hydroxyl Groups The synthesis of Example 8A. was repeated to give a phenolic hydroxyl functional polyimide polycyanate. The dry filtrate from the work-up was held as a solution and used to coat a 32 mm by 3 mm thick polished NaCl disk maintained under a dry nitrogen atmosphere. In the method, the disk was maintained on a level platform and the solution of phenolic hydroxyl functional polyimide polycyanate was applied using a polypropylene dropper. Two hours was allowed for evaporation of the solvent. FTIR spectrophotometric analysis of the film of the phenolic hydroxyl functional polyimide polycyanate on the NaCl plate revealed residual hydroxyl group absorbance at 3493 cm$^{-1}$ and appearance of medium cyano group stretching absorbances at 2262 and 2217 cm$^{-1}$. Additionally observed were broad carbonyl absorbance associated with a cyclic five membered ring imide at 1729 cm$^{-1}$ with a shoulder at 1781 cm$^{-1}$, weak absorbance associated with a cyclic imide at 800 cm$^{-1}$, and medium absorbances associated with the aromatic ring at 1493 and 1618 cm$^{-1}$.

The thin film on the NaCl disk was heated in an oven at 200° C. for 4 hours providing a visually flawless, transparent, yellow colored, cured, thin film coating. FTIR spectrophotometric analysis of the film of the phenolic hydroxyl functional polyimide polycyanate on the NaCl plate revealed the expected hydroxyl group absorbance at 3493 cm$^{-1}$ along with weak cyano group stretching absorbance at 2262 cm$^{-1}$ with a very weak shoulder at 2211 cm$^{-1}$.

B. Catalyzed Polyimide Polycyanate with Residual Phenolic Hydroxyl Groups

A portion (2 milliliters) of the phenolic hydroxyl functional polyimide polycyanate solution from A. above was combined with 1% weight cobalt naphthenate solution in dichloromethane (4 drops) and used to coat a 32 mm by 3 mm thick polished NaCl disk maintained under a dry nitrogen atmosphere using the method of A. above. FTIR spectrophotometric analysis of the film of the phenolic hydroxyl functional polyimide polycyanate on the NaCl plate revealed residual hydroxyl group absorbance at 3500 cm$^{-1}$ and appearance of medium cyano group stretching absorbances at 2262 and 2217 cm$^{-1}$. Additionally observed were broad carbonyl absorbance associated with a cyclic five membered ring imide at 1729 cm$^{-1}$ with a shoulder at 1781 cm$^{-1}$, weak absorbance associated with a cyclic imide at 800 cm$^{-1}$, and medium absorbances associated with the aromatic ring at 1493 and 1618 cm$^{-1}$.

The thin film on the NaCl disk was heated in an oven at 200° C. for 4 hours providing a visually flawless, transparent, yellow colored, cured, thin film coating. FTIR spectrophotometric analysis of the film of the phenolic hydroxyl functional polyimide polycyanate on the NaCl plate revealed hydroxyl group absorbance at 3490 cm$^{-1}$ and only a trace of the cyano group stretching absorbances remaining at 2276 and 2208 cm$^{-1}$.

Example 10—Synthesis of Polyimide Polycyanate with Phenolic Hydroxyl Groups and Iminocarbonate Groups Methanol (40 milliliters) and phenolic hydroxyl functional polyimide polycyanate solution (10 milliliters) from Example 9A. were added to a two ounce glass bottle along with a magnetic stirring bar then sealed with a cap. The opaque white mixture was magnetically stirred for 17 hours then rotary evaporated using a maximum oil bath temperature of 60° C. followed by drying in the vacuum oven for one hour at 100° C. The resultant product was pieces of a transparent film with a light green color. FTIR analysis of a KBr pellet of the product gave a ratio of 0.057 for the cyanate absorbance at 2271 cm$^{-1}$ divided by the carbonyl absorbance at 1726 cm$^{-1}$. This was a 77% decrease in the ratio of cyanate to carbonyl absorbance from that of the phenolic hydroxyl functional polyimide polycyanate reactant. The expected hydroxyl group, carbonyl absorbances associated with the imide, and absorbances associated with the aromatic ring, were retained.

Example 11—Synthesis of Polyimide with Phenolic Hydroxyl Groups and Iminocarbonate Groups Methanol (5 milliliters) and phenolic hydroxyl functional polyimide polycyanate solution (15 milliliters) from Example 9A. were added to a two ounce glass bottle along with a magnetic stirring bar, then sealed with a cap. The light yellow colored solution was magnetically stirred for 22 hours then rotary evaporated using a maximum oil bath temperature of 60° C. followed by drying in the vacuum oven for one hour at 100° C. FTIR analysis of a KBr pellet of the product demonstrated complete disappearance of the cyano group stretching absorbances with retention of the expected hydroxyl group, carbonyl absorbances associated with the imide, and absorbances associated with the aromatic ring.

The invention claimed is:

1. A polymer of intrinsic microporosity comprising a repeating unit as represented by Formula Ia:

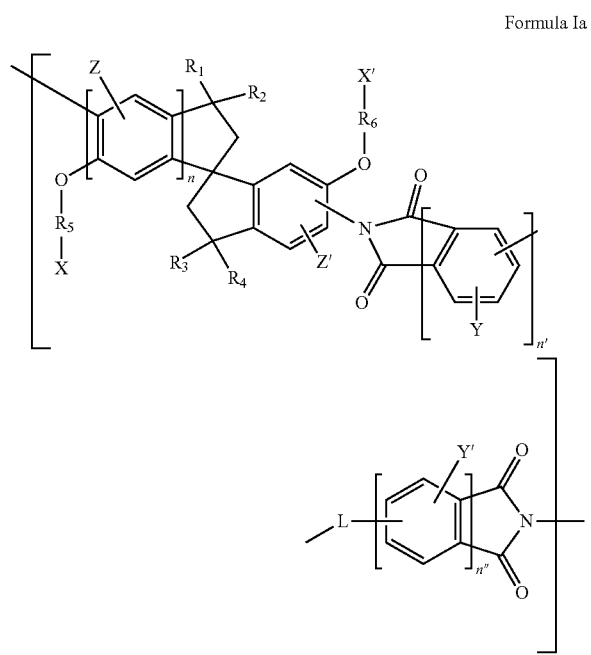

Formula Ia wherein:
n, n' and n'' are each 1;
L is a linking group selected from a covalent bond, ketone, sulfone group or hydrocarbon comprising from 1 to 6 carbon atoms;
$R_1$, $R_2$, $R_3$, and $R_4$ are independently selected from alkyl groups comprising from 1 to 6 carbon atoms, with the proviso that:
  i) $R_1$ and $R_2$ may alternatively collectively form a ketone group or a 9,9'-fluorene group, and
  ii) $R_3$ and $R_4$ may collectively form a ketone group or a 9,9'-fluorene group;
$R_5$ and $R_6$ are independently selected from: a bond and an alkylene group comprising from 1 to 6 carbon atoms;
X and X' are independently selected from: a carboxylic acid and sulfonic acid and their corresponding salt or ester, imino, amide, nitrile, hydrogen, hydroxyl and alkenyl comprising from 1 to 6 carbon atoms, with the proviso that no more than one of X and X' is selected from hydrogen or hydroxyl; and
Y and Y' is independently selected from hydrogen, hydroxyl or sulfonate group including its corresponding salt or ester, which may be located at any open position on the ring; and
Z and Z' are independently selected from: carboxylic acid or sulfonate including their corresponding salts or esters; hydrogen, hydroxyl, nitrile, and alkoxy comprising from 1 to 6 carbon atoms, which may be located at any open position on the ring.

2. The polymer of claim 1 wherein Z, Z', Y and Y' are hydrogen or hydroxyl.

3. The polymer of claim 1 wherein $R_1$, $R_2$, $R_3$, and $R_4$ are independently selected from: methyl, $R_1$ and $R_2$ collectively form a ketone, and $R_3$ and $R_4$ collectively form a ketone group.

4. The polymer of claim 1 wherein $R_5$ and $R_6$ are independently selected from a covalent bond and a methylene group.

5. The polymer of claim 1 wherein at least one X and X' is a nitrile group.

6. The polymer of claim 1 wherein at least one of X and X' is selected from a carboxylic acid and its corresponding salt or ester, iminocarbamate or iminocarbonate.

7. A membrane comprising the polymer of claim 1.

8. A polymer of intrinsic microporosity comprising a repeating unit as represented by Formula Ib:

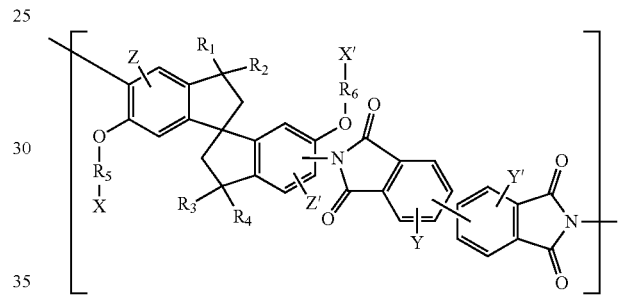

wherein:
$R_1$, $R_2$, $R_3$, and $R_4$ are independently selected from alkyl groups comprising from 1 to 6 carbon atoms, with the proviso that:
  i) $R_1$ and $R_2$ may alternatively collectively form a ketone group or a 9,9'-fluorene group, and
  ii) $R_3$ and $R_4$ may collectively form a ketone group or a 9,9'-fluorene group;
$R_5$ and $R_6$ are independently selected from: a bond and an alkylene group comprising from 1 to 6 carbon atoms;
X and X' are independently selected from: a carboxylic acid and sulfonic acid and their corresponding salt or ester, imino, amide, nitrile, hydrogen, hydroxyl and alkenyl comprising from 1 to 6 carbon atoms, with the proviso that no more than one of X and X' is selected from hydrogen or hydroxyl; and
Y and Y' is independently selected from hydrogen, hydroxyl or sulfonate group including its corresponding salt or ester, which may be located at any open position on the ring; and
Z and Z' are independently selected from: carboxylic acid or sulfonate including their corresponding salts or esters; hydrogen, hydroxyl, nitrile, and alkoxy comprising from 1 to 6 carbon atoms, which may be located at any open position on the ring.

9. The polymer of claim 8 wherein Z, Z', Y and Y' are hydrogen or hydroxyl.

10. The polymer of claim 8 wherein $R_1$, $R_2$, $R_3$, and $R_4$ are independently selected from: methyl, $R_1$ and $R_2$ collectively form a ketone, and $R_3$ and $R_4$ collectively form a ketone group; and wherein $R_5$ and $R_6$ are independently selected from a covalent bond and a methylene group.

11. The polymer of claim 8 wherein at least one of X and X' is selected from: a nitrile group, carboxylic acid and its corresponding salt or ester, iminocarbamate and iminocarbonate.

* * * * *